US012008951B2

(12) United States Patent
Lee

(10) Patent No.: US 12,008,951 B2
(45) Date of Patent: Jun. 11, 2024

(54) DISPLAY DEVICE AND ELECTRONIC DEVICE

(71) Applicant: Samsung Display Co., Ltd., Yongin-Si (KR)

(72) Inventor: Kyung-Hun Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/222,976

(22) Filed: Jul. 17, 2023

(65) Prior Publication Data

US 2024/0135864 A1 Apr. 25, 2024

(30) Foreign Application Priority Data

Oct. 24, 2022 (KR) ........................ 10-2022-0137592

(51) Int. Cl.
*G09G 3/32* (2016.01)

(52) U.S. Cl.
CPC ....... *G09G 3/32* (2013.01); *G09G 2310/0275* (2013.01); *G09G 2320/0247* (2013.01); *G09G 2330/021* (2013.01); *G09G 2330/028* (2013.01)

(58) Field of Classification Search
CPC ............. G09G 3/32; G09G 2310/0275; G09G 2320/0247; G09G 2330/021; G09G 2330/028
See application file for complete search history.

(56) References Cited

U.S. PATENT DOCUMENTS

| | | | | |
|---|---|---|---|---|
| 6,209,117 | B1 | 3/2001 | Kim | |
| 2016/0189635 | A1* | 6/2016 | Lee | G09G 3/3291 345/77 |
| 2016/0314760 | A1* | 10/2016 | Jangda | G09G 3/3208 |
| 2018/0261184 | A1* | 9/2018 | Ninan | H04N 5/202 |
| 2019/0340977 | A1* | 11/2019 | Park | G09G 3/3275 |
| 2020/0160801 | A1* | 5/2020 | Wang | H04N 1/4078 |
| 2020/0211457 | A1* | 7/2020 | Kim | G09G 3/3233 |

FOREIGN PATENT DOCUMENTS

| | | | |
|---|---|---|---|
| KR | 10-0287141 | B1 | 4/2001 |
| KR | 10-2008-0057434 | A | 6/2008 |

* cited by examiner

*Primary Examiner* — Andrew Sasinowski
(74) *Attorney, Agent, or Firm* — Innovation Counsel LLP

(57) ABSTRACT

Disclosed is a display device which includes a display panel, a voltage generator, and a driving controller. The voltage generator generates a driving voltage and determines a voltage level of the driving voltage based on a voltage control signal. A current compensator calculates a load based on previous image data and outputs compensation image data with target luminance by compensating for current image data based on the load. The driving controller turns on the current compensator in a normal mode such that an image is displayed with the target luminance, and turns off the current compensator in a setting mode such that an image corresponding to the current image data is displayed with given reference luminance.

21 Claims, 19 Drawing Sheets

DISPLAY DEVICE AND ELECTRONIC DEVICE

CROSS-REFERENCE TO RELATED APPLICATIONS

This application claims priority under 35 U.S.C. § 119 to Korean Patent Application No. 10-2022-0137592 filed on Oct. 24, 2022, in the Korean Intellectual Property Office, the disclosures of which are incorporated by reference herein in their entireties.

BACKGROUND

Embodiments of the present disclosure described herein generally relate to a display device and an electronic device, and more particularly, relate to a display device and an electronic device capable of preventing a flicker phenomenon and a decrease in a response speed that are caused when an operation for reducing power consumption is performed.

A light emitting display device among display devices displays an image by a light emitting diode that generates a light through the recombination of electrons and holes. The light emitting display device is advantageous in that power consumption is small and a response speed is fast.

The light emitting display device includes pixels connected with data lines and a scan line. Each of the pixels generally includes a light emitting diode (or element), and a pixel circuit unit for controlling the amount of current flowing to the light emitting diode. In response to a data signal, the pixel circuit unit controls the amount of current that flows from a first driving voltage to a second driving voltage through the light emitting diode. In this case, there is generated a light of luminance corresponding to the amount of current flowing through the light emitting diode.

SUMMARY

Embodiments of the present disclosure provide a display device and an electronic device for preventing a flicker phenomenon and a decrease in a response speed that are caused when an operation for reducing power consumption is performed.

According to an embodiment, a display device includes a display panel, a voltage generator, and a driving controller. The display panel includes a pixel receiving a driving voltage. The voltage generator generates the driving voltage and determines a voltage level of the driving voltage based on a voltage control signal. The driving controller controls driving of the display panel. The driving controller includes a current compensator that calculates a load based on a previous image data and outputs compensation image data with a target luminance by compensating for current image data based on the load. The driving controller turns on the current compensator in a normal mode such that an image is displayed with the target luminance, and turns off the current compensator in a setting mode such that an image corresponding to the current image data is displayed with a given reference luminance.

According to an embodiment, a display device includes a display panel, a voltage generator, and a power consumption controller. The display panel includes a pixel receiving a driving voltage. The voltage generator generates the driving voltage, to change a voltage level of the driving voltage as much as a given first variation or more, based on a voltage control signal, and changes the voltage level of the driving voltage as much as a second variation or less, based on a holding control signal, the second variation being smaller than the first variation. The power consumption controller determines whether a previous image based on previous image data coincides with a given grayscale pattern condition and generates the voltage control signal or the holding control signal depending on a result of the determination whether the previous image based on the previous image data coincides with the given grayscale pattern condition.

According to an embodiment, an electronic device includes a display module, a driving controller, and a main processor. The display module includes a display panel receiving a driving voltage and a voltage generator generating the driving voltage and determining a voltage level of the driving voltage based on a voltage control signal. The driving controller receives an image signal and converts the image signal into an image data. The main processor provides the image signal to the driving controller. The driving controller includes a current compensator that calculates a load based on a previous image data and outputs compensation image data with target luminance by compensating for current image data based on the load. The driving controller turns on the current compensator in a normal mode such that an image is displayed with the target luminance, and turns off the current compensator in a setting mode such that an image corresponding to the current image data is displayed with given reference luminance.

According to an embodiment, an electronic device includes a display panel receiving a driving voltage, a voltage generator, a driving controller, a main processor, and a power consumption controller. The voltage generator generates the driving voltage, changes a voltage level of the driving voltage as much as a given first variation or more, based on a voltage control signal, and changes the voltage level of the driving voltage as much as a second variation or less, based on a holding control signal, the second variation being smaller than the first variation. The driving controller receives an image signal and converts the image signal into an image data. The main processor provides the image signal to the driving controller. The power consumption controller determines whether a previous image based on a previous image data coincides with a given grayscale pattern condition and generates the voltage control signal or the holding control signal depending on a result of a determination whether the previous image based on the previous image data coincides with the given grayscale pattern condition.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
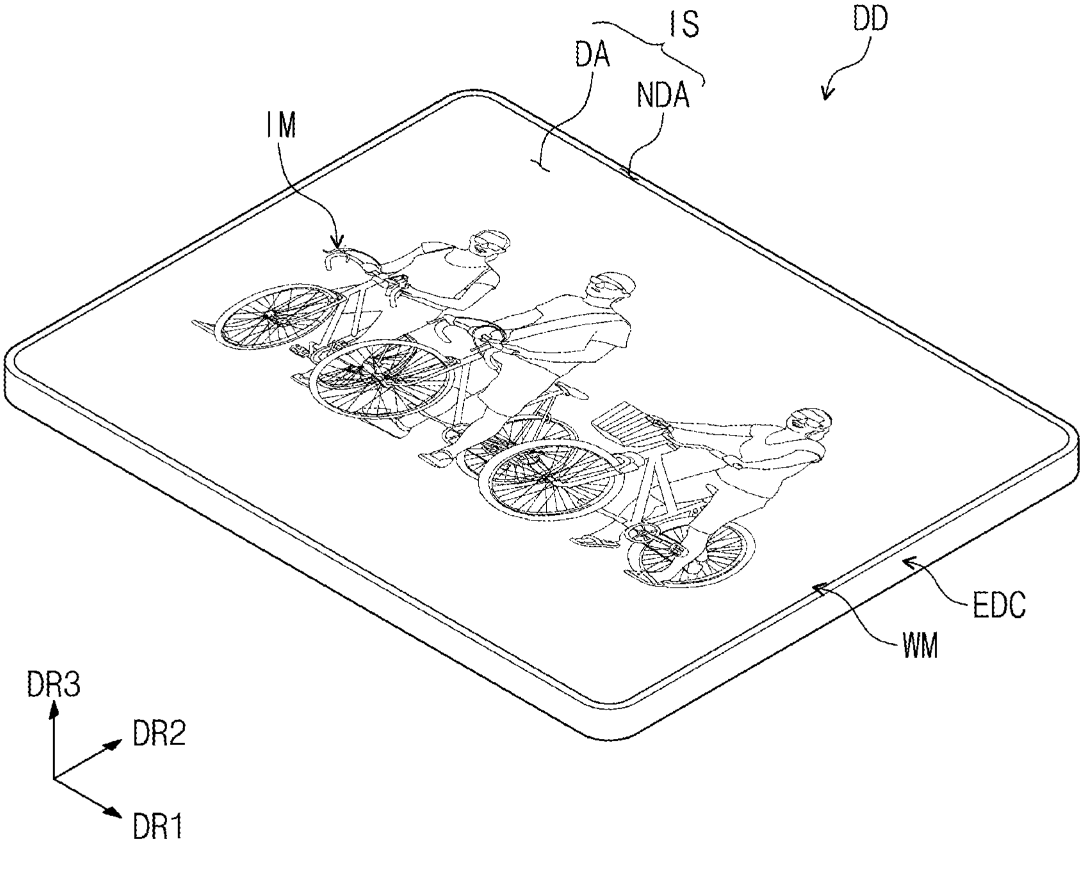
FIG. 1 is a perspective view illustrating a display device according to an embodiment of the present disclosure.

In the specification, the expression that a first component (or area, layer, part, portion, etc.) is "on", "connected with", or "coupled to" a second component means that the first component is directly on, connected with, or coupled to the second component or means that a third component is interposed therebetween.

The same reference numeral refers to the same component. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the disclosure, a first component may be referred to as a "second component", and similarly, the second component may be referred to as the "first component". The singular forms are intended to include the plural forms unless the context clearly indicates otherwise.

Also, the terms "under", "below", "on", "above", etc. are used to describe the correlation of components illustrated in drawings. The terms are relative and are described with reference to a direction indicated in the drawing.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

Figure 2:
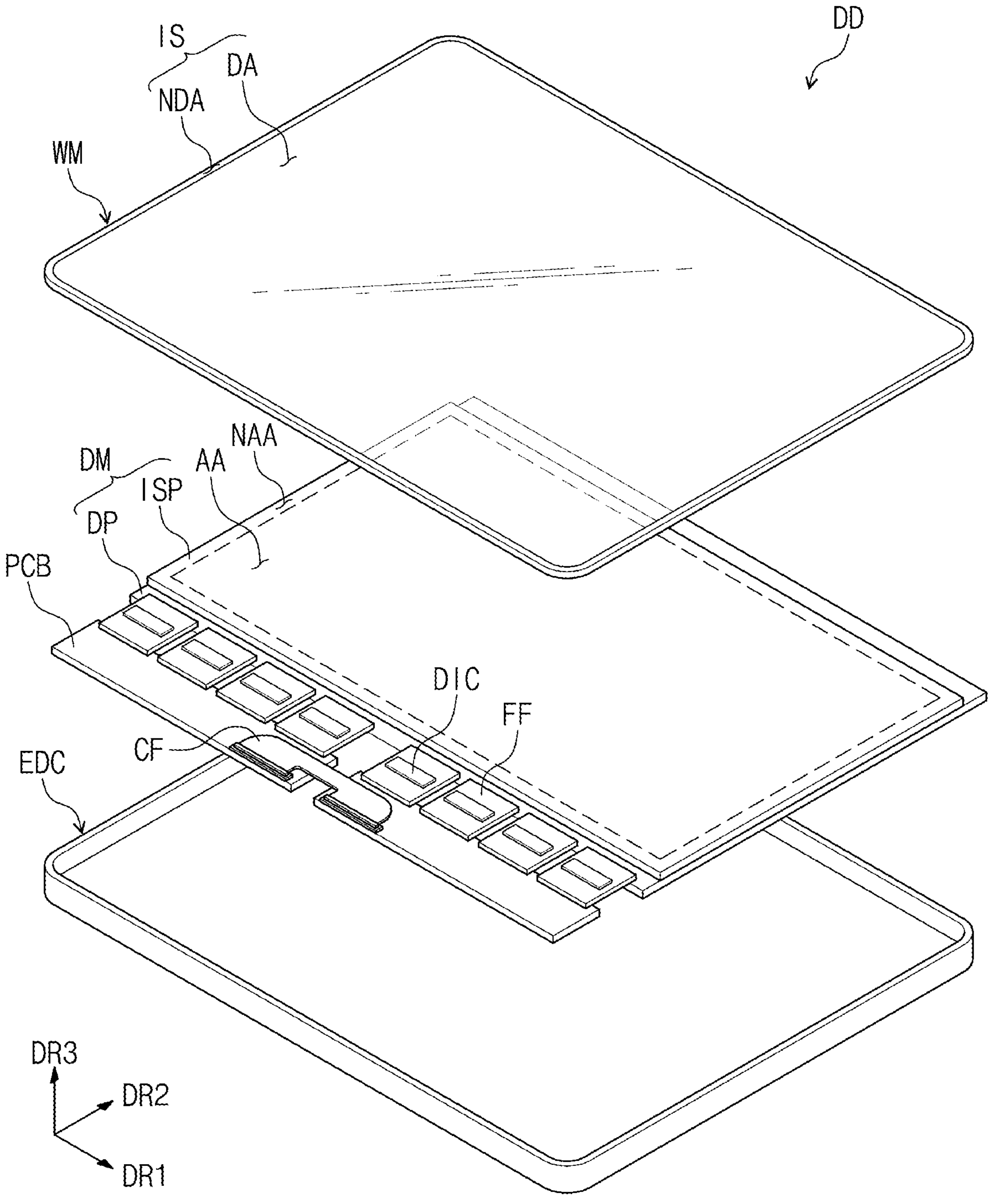
FIG. 2 is an exploded perspective view of a display device according to an embodiment of the present disclosure.

FIG. 1 is a perspective view of a display device according to an embodiment of the present disclosure, and FIG. 2 is an exploded perspective view of a display device according to an embodiment of the present disclosure.

Referring to FIGS. 1 and 2, a display device DD may be a device that is activated depending on an electrical signal. The display device DD according to the present disclosure may be a small and medium-sized electronic device such as a mobile phone, a tablet, a vehicle navigation system, or a game console, as well as a large-sized electronic device such as a television or a monitor. The above examples are provided only as an example, and it is obvious that the display device DD may be implemented with any other display device(s) without departing from the concept of the disclosure. The display device DD is in the shape of a rectangle having a long edge (or side) in a first direction DR1 and a short edge (or side) in a second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined with respect to a direction in which the image IM is displayed. The front surface and the rear surface may be opposite to each other in the third direction DR3, and the normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs, such as a part of his/her body, a light, heat, his/her eye, and pressure, or a combination thereof. Also, the display device DD may sense the external input of the user applied to a side surface or a rear surface of the display device DD depending on a structure of the display device DD and is not limited to an embodiment. As an example of the present disclosure, the external input may include an input by an input device (e.g., a stylus pen, an active pen, a touch pen, an electronic pen, or an E-pen).

The display surface IS of the display device DD may be divided into a display area DA and a non-display area NDA. The display area DA may refer to an area in which the image IM is displayed. The user visually perceives the image IM through the display area DA. In an embodiment, the display area DA is illustrated in the shape of a quadrangle whose vertexes are rounded. However, this is illustrated as an example. The display area DA may have various shapes, not limited to any one embodiment.

The non-display area NDA is adjacent to the display area DA. The non-display area NDA may have a given color. The non-display area NDA may surround the display area DA. As such, the shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments and is not limited to any one embodiment.

As illustrated in FIG. 2, the display device DD may include a display module DM and a window WM disposed on or over the display module DM. The display module DM may include a display panel DP and an input sensing layer ISP.

The display panel DP according to an embodiment of the present disclosure may be a light emitting display panel. For example, the display panel DP may be an organic light emitting display panel, an inorganic light emitting display panel, a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include a quantum dot, a quantum rod, etc.

The display panel DP may output the image IM, and the output image IM may be displayed on the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a continuous process. That is, in the case where the input sensing layer ISP is directly disposed on the display panel DP, an inner adhesive film (not illustrated) is not interposed between the input sensing layer ISP and the display panel DP. However, the inner adhesive film may be interposed between the input sensing layer ISP and the display panel DP. In this case, the input sensing layer ISP is not manufactured by a process continuous to that of the display panel DP. That is, the input sensing layer ISP may be manufactured through a process that is separate from that of the display panel DP and may then be fixed on an upper surface of the display panel DP by the inner adhesive film.

The window WM may be formed of a transparent material capable of outputting the image IM. For example, the window WM may be formed of glass, sapphire, plastic, or the like. An example in which the window WM is implemented with a single layer is illustrated, but the present disclosure is not limited thereto. For example, the window WM may include a plurality of layers.

Meanwhile, although not illustrated, the non-display area NDA of the display device DD described above may correspond to an area that is defined by printing a material including a given color on one area of the window WM. As an example of the present disclosure, the window WM may include a light blocking (or shielding) pattern for defining the non-display area NDA. The light blocking pattern that is a colored organic film may be formed, for example, in a coating manner.

The window WM may be coupled to the display module DM by an adhesive film. As an example of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) film or a pressure sensitive adhesive (PSA) film.

An anti-reflection layer may be further disposed between the window WM and the display module DM. The anti-reflection layer decreases reflectance of an external light incident from above the window WM. The anti-reflection layer according to an embodiment of the present disclosure may include a phase retarder and a polarizer. The phase retarder may have a film type or a liquid crystal coating type and may include a X./2 phase retarder and/or a k/4 phase retarder. The polarizer may also have a film type or a liquid crystal coating type. The polarizer of the film type may include a stretch-type synthetic resin film, and the polarizer of the liquid crystal coating type may include liquid crystals arranged in a given direction. The phase retarder and the polarizer may be implemented with one polarization film.

As an example of the present disclosure, the anti-reflection layer may also include color filters. The arrangement of color filters may be determined in consideration of colors of lights that a plurality of pixels PX (refer to FIG. 3) included in the display panel DP generate. In this case, the anti-reflection layer may further include a light blocking pattern disposed between color filters.

The display module DM may display the image IM depending on an electrical signal and may send/receive information about an external input. The display module DM may be defined by an effective area AA and a non-effective area NAA. The effective area AA may be defined as an area in which the image IM is output from the display panel DP (i.e., an area in which the image IM is displayed). Also, the effective area AA may be defined as an area in which the input sensing layer ISP senses an external input applied from the outside. According to an embodiment, the effective area AA of the display module DM may correspond to (or overlap) at least a portion of the display area DA in the third direction DR3.

The non-effective area NAA is adjacent to the effective area AA. The non-effective area NAA may refer to an area in which the image IM is not displayed substantially. For example, the non-effective area NAA may surround the effective area AA. However, this is illustrated as an example. For example, the non-effective area NAA may be defined in various shapes, not limited to any one embodiment. According to an embodiment, the non-effective area NAA of the display module DM may correspond to (or overlap) at least a portion of the non-display area NDA in the third direction DR3.

The display device DD may further include a plurality of flexible films FF connected with the display panel DP. A driver chip DIC may be mounted on each of the flexible films FF. As an example of the present disclosure, a data driver 200 (see FIG. 3) may include the plurality of driver chips DIC, and the plurality of driver chips DIC may be respectively mounted on the plurality of flexible films FF.

The display device DD may further include at least one circuit board PCB coupled with the plurality of flexible films FF. As an example of the present disclosure, the four circuit boards PCB are provided in the display device DD, but the number of circuit boards PCB is not limited thereto. Two circuit boards adjacent to each other from among the circuit boards PCB may be electrically connected with each other by a connecting film CF. Also, at least one of the circuit boards PCB may be electrically connected with a main board. A driving controller 100 (see FIG. 3) and a voltage generator 300 (see FIG. 3) may be disposed on at least one of the circuit boards PCB.

FIG. 2 shows a structure in which each of the driver chips DIC is mounted on each of the flexible films FF, but the present disclosure is not limited thereto. For example, the driver chips DIC may be directly mounted on the display panel DP. In this case, a portion of the display panel DP, on which the driver chip DIC is mounted, may be bent such that the driver chip DIC is disposed on a rear surface of the display module DM.

The input sensing layer ISP may be electrically connected with the circuit board PCB through the flexible films FF. However, the present disclosure is not limited thereto. That is, the display module DM may additionally include a separate flexible film for electrically connecting the input sensing layer ISP and the circuit board PCB.

The display device DD further includes a housing EDC accommodating the display module DM. The housing EDC may be coupled with the window WM to define the exterior of the display device DD. The housing EDC may absorb external shocks and may prevent a foreign material/moisture or the like from being infiltrated into the display module DM such that components accommodated in the housing EDC are protected. Meanwhile, as an example of the present disclosure, the housing EDC may be provided in the form of a combination of a plurality of accommodating members.

The display device DD according to an embodiment may further include an electronic module including various functional modules for operating the display module DM, a power supply module (e.g., a battery) for supplying a power necessary for an overall operation of the display device DD, a bracket coupled with the display module DM and/or the housing EDC to partition an inner space of the display device DD, etc.

Figure 3:
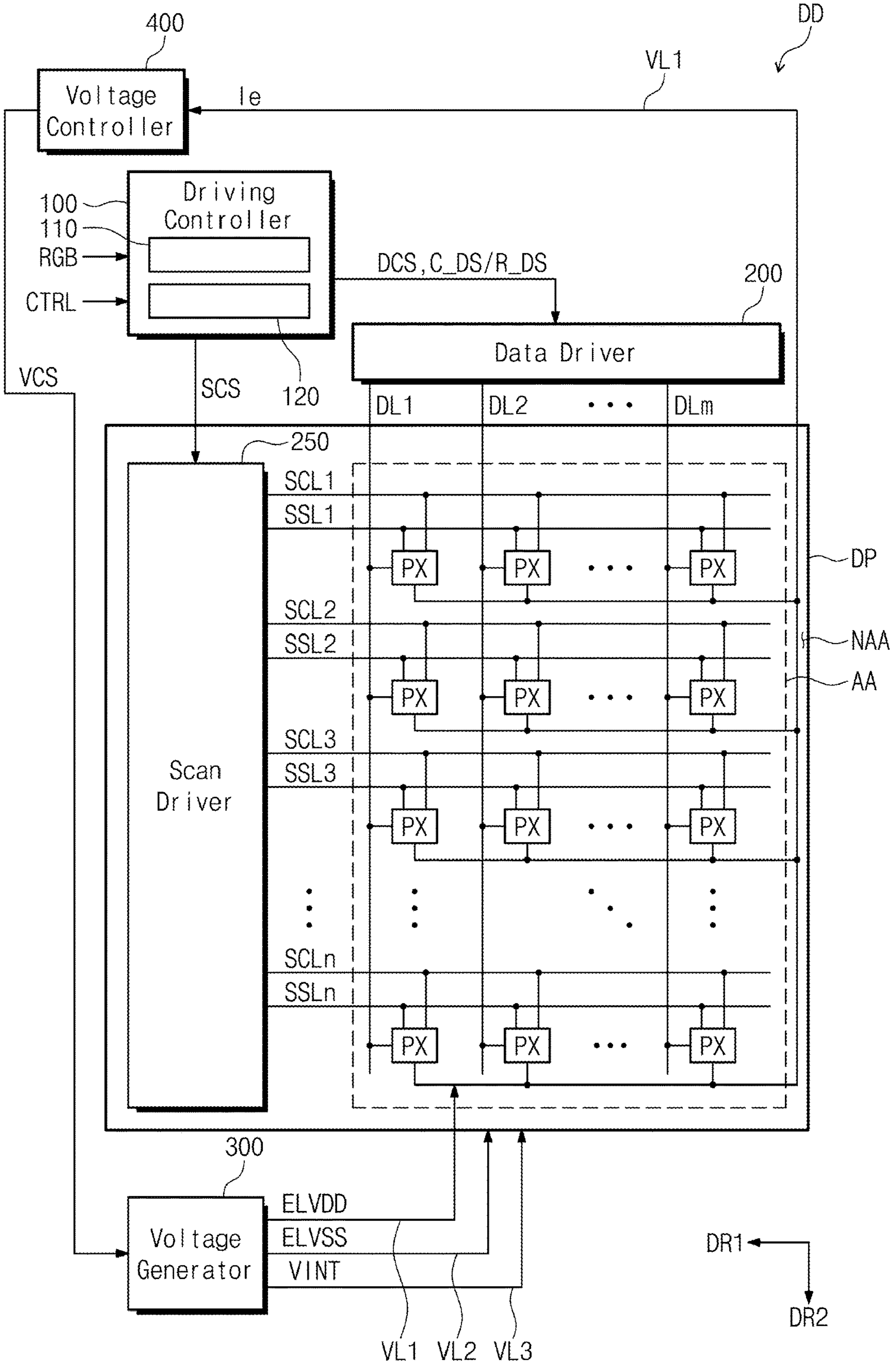
FIG. 3 is a block diagram of a display device according to an embodiment of the present disclosure.

FIG. 3 is a block diagram of a display device according to an embodiment of the present disclosure.

Referring to FIG. 3, the display device DD includes the driving controller 100, the data driver 200, a scan driver 250, the voltage generator 300, a voltage controller 400, and the display panel DP.

The driving controller 100 receives an input image signal RGB and a control signal CTRL from a main controller (e.g., a microcontroller). The driving controller 100 may generate image data by converting a data format of the input image signal RGB in compliance with the specification for an interface with the data driver 200. The driving controller 100 may receive the input image signal RGB in units of frame. The image data may be named differently depending on a corresponding frame. That is, image data converted from the input image signal RGB received during a previous frame may be referred to as "previous image data", and image data converted from the input image signal RGB received during a current frame may be referred to as "current image data".

As an embodiment of the present disclosure, the driving controller 100 may include a current compensator 110. The current compensator 110 calculates a load based on the previous image data, compensates for the current image data based on the load, and outputs compensation image data C_DS with target luminance corresponding to the load as a result of the compensation. In a normal mode not coinciding with at least one of given cases, the driving controller 100 turns on the current compensator 110 such that an image of the target luminance is displayed. That is, in the normal mode, the driving controller 100 outputs the compensation image data C_DS generated by the current compensator 110.

In a setting mode coinciding with at least one of the given cases, the driving controller 100 may turn off the current compensator 110 such that an image of given reference luminance corresponding to the current image data is displayed. As an embodiment of the present disclosure, the driving controller 100 may further include a reference compensator 120 that compensates for the current image data such that reference image data R_DS with the reference luminance is output. That is, in the setting mode, the driving controller 100 may output the reference image data R_DS generated by the reference compensator 120.

A structure in which the current compensator 110 and the reference compensator 120 are embedded in the driving controller 100 is illustrated in FIG. 3 as an example, but the present disclosure is not limited thereto. Alternatively, at least one of the current compensator 110 and the reference compensator 120 may be provided as a component independent of the driving controller 100.

The driving controller 100 generates a scan control signal SCS and a data control signal DCS based on the control signal CTRL.

The data driver 200 receives the data control signal DCS from the driving controller 100. The data driver 200 receives the compensation image data C_DS from the driving controller 100 in the normal mode and receive the reference image data R_DS from the driving controller 100 in the setting mode. The data driver 200 converts the compensation image data C_DS or the reference image data R_DS into data voltages (or data signals) based on a gamma reference voltage and outputs the data voltages to a plurality of data lines DL1 to DLm, which will be described later. The data voltages are analog voltages corresponding to grayscale values of the compensation image data C_DS or the reference image data R_DS. The data voltages converted from the compensation image data C_DS may be referred to as "compensation data voltages", and the data voltages converted from the reference image data R_DS may be referred to as "reference data voltages".

As an example of the present disclosure, the data driver 200 may be disposed within the driver chips DIC illustrated in FIG. 2.

The scan driver 250 receives the scan control signal SCS from the driving controller 100. In response to the scan control signal SCS, the scan driver 250 may output first scan signals to first scan lines SCL1 to SCLn to be described later and may output second scan signals to second scan lines SSL1 toSSLn to be described later.

The display panel DP includes the first scan lines SCL1 to SCLn, the second scan lines SSL1 to SSLn, the data lines DL1 to DLm, and pixels PX. The display panel DP may be divided into the effective area AA and the non-effective area NAA. The pixels PX may be disposed in the effective area AA, and the scan driver 250 may be disposed in the non-effective area NAA.

The first scan lines SCL1 to SCLn and the second scan lines SSL1 to SSLn extend to be parallel to the first direction DR1 and are arranged to be spaced from each other in the second direction DR2. The data lines DL1 to DLm extend from the data driver 200 in a direction parallel to the second direction DR2 and are arranged to be spaced from each other in the first direction DR1.

The plurality of pixels PX are electrically connected with the first scan lines SCL1 to SCLn, the second scan lines SSL1 to SSLn, and the data lines DL1 to DLm, respectively. For example, pixels in a first row may be connected with the scan lines SCL1 and SSL1. Also, pixels in a second row may be connected with the scan lines SCL2 and SSL2.

Each of the plurality of pixels PX includes a light emitting element ED (refer to FIG. 4B) and a pixel circuit unit PXC (refer to FIG. 4B) controlling the emission of the light emitting element ED. The pixel circuit unit PXC may include a plurality of transistors and a capacitor. The scan driver 250 may include transistors formed through the same process as the pixel circuit unit PXC. In an embodiment, the light emitting element ED may be an organic light emitting diode. However, the present disclosure is not limited thereto.

In an embodiment, the scan driver 250 is disposed on a first side of the display panel DP. The first scan lines SCL1 to SCLn and the second scan lines SSL1 to SSLn extend from the scan driver 250 to be parallel to the first direction DR1. The scan driver 250 is disposed adjacent to a first side of the effective area AA, but the present disclosure is not limited thereto. In another embodiment, the scan driver 250 may be disposed adjacent to each of the first side and a second side of the effective area AA. For example, the scan driver 250 disposed on the first side of the effective area AA may provide the first scan signals to the first scan lines SCL1 to SCLn, and the scan driver 250 disposed on the second side of the effective area AA may provide the second scan signals to the second scan lines SSL1 to SSLn.

Each of the plurality of pixels PX receives a first driving voltage (or a driving voltage) ELVDD, a second driving voltage ELVSS, and an initialization voltage VINT.

The voltage generator 300 generates voltages necessary for an operation of the display panel DP. In an embodiment of the present disclosure, the voltage generator 300 generates the first driving voltage ELVDD, the second driving voltage ELVSS, and the initialization voltage VINT, which are necessary for the operation of the display panel DP. The first driving voltage ELVDD, the second driving voltage ELVSS, and the initialization voltage VINT may be provided to the display panel DP through a first voltage line (or driving voltage line) VL1, a second voltage line VL2, and a third voltage line VL3.

Like the first driving voltage ELVDD, the second driving voltage ELVSS, and the initialization voltage VINT, the voltage generator 300 may further generate various voltages (e.g., a gamma reference voltage, a data driving voltage, a gate-on voltage, and a gate-off voltage) necessary for operations of the data driver 200 and the scan driver 250.

The voltage controller 400 is connected with the first voltage line VL1 and detects a driving current Ie flowing through the first voltage line VL1 in units of detection period. The voltage controller 400 compares the detected driving current Ie, and a given reference current and generates a voltage control signal VCS depending on a comparison result. The voltage controller 400 may provide the voltage control signal VCS to the voltage generator 300. The voltage generator 300 may adjust the voltage level of the first driving voltage ELVDD in response to the voltage control signal VCS.

As an example of the present disclosure, the voltage controller 400 and the driving controller 100 illustrated in FIG. 3 may be mounted on the printed circuit board PCB illustrated in FIG. 2. As an embodiment of the present disclosure, the voltage controller 400 may be embedded in the main controller or the driving controller 100. Alternatively, the voltage controller 400 may be disposed on the printed circuit board PCB, and the driving controller 100 may be disposed in the driver chips DIC illustrated in FIG. 2 together with the data driver 200. An example in which the voltage controller 400 is a component independent of the driving controller 100 is illustrated in FIG. 3, but the present disclosure is not limited thereto. For example, the voltage controller 400 and the driving controller 100 may be integrated into one component (e.g., a main controller).

As an embodiment of the present disclosure, the voltage controller 400 may communicate with the voltage generator 300 by the $I^2C$ interface manner. That is, the voltage controller 400 may send the voltage control signal VCS to the voltage generator 300 by the $I^2C$ interface manner.

Figure 4A:
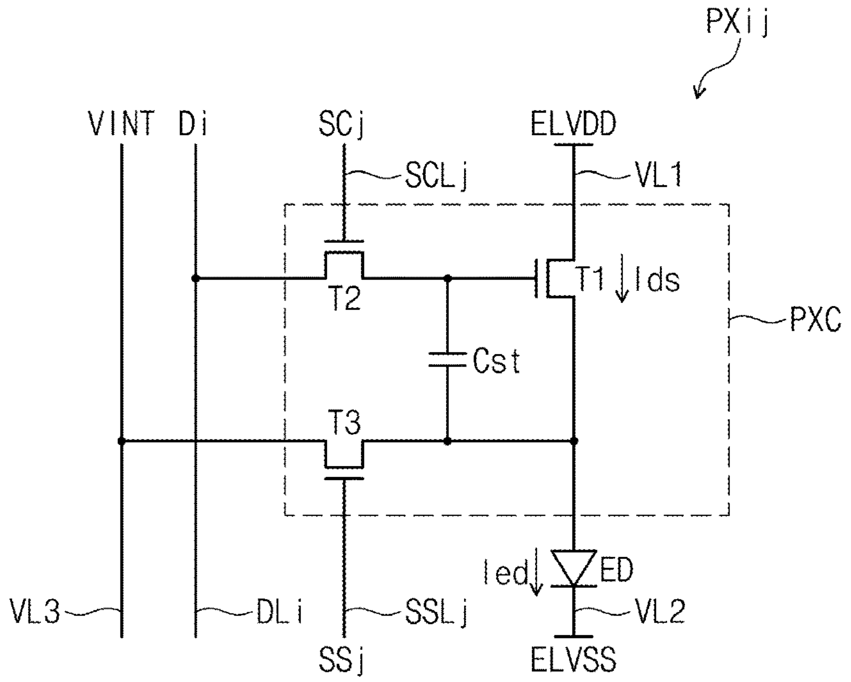
FIG. 4A is an equivalent circuit diagram of a pixel according to an embodiment of the present disclosure.
Figure 4B:
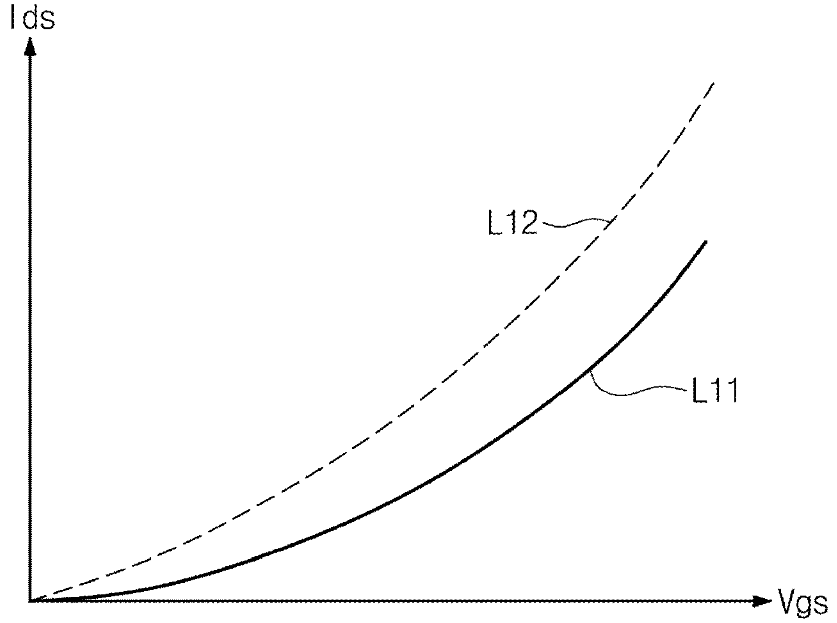
FIG. 4B is a diagram illustrating how a current-voltage characteristic of a first transistor changes depending on a first driving voltage.

FIG. 4A is a circuit diagram of a pixel according to an embodiment of the present disclosure. FIG. 4B is a diagram illustrating a current-voltage characteristic of a first transistor illustrated in FIG. 4A.

FIG. 4A shows an equivalent circuit diagram of a pixel PXij that is connected with an i-th data line DLi among the data lines DL1 to DLm (refer to FIG. 3), a j-th first scan line SCLj among the first scan lines SCL1 to SCLn (refer to FIG. 3), and a j-th second scan line SSLj among the second scan lines SSL1 to SSLn (refer to FIG. 3).

Each of the plurality of pixels PX illustrated in FIG. 3 may have the same circuit configuration as the equivalent circuit of the pixel PXij illustrated in FIG. 4A. In an embodiment, the pixel PXij includes at least one light emitting element ED and the pixel circuit unit PXC.

The pixel circuit unit PXC may include at least one transistor that is electrically connected with the light emitting element ED and is used to provide a current corresponding to a data signal Di transferred from the i-th data line DLi to the light emitting element ED. As an embodiment of the present disclosure, the pixel circuit unit PXC of the pixel PXij includes a first transistor T1, a second transistor T2, a third transistor T3, and a capacitor Cst. Each of the first to third transistors T1 to T3 may be an N-type transistor using an oxide semiconductor as a semiconductor layer. However, the present disclosure is not limited thereto. For example, each of the first to third transistors T1 to T3 may be a P-type transistor having a low-temperature polycrystalline silicon (LTPS) semiconductor layer. Alternatively, at least one of the first to third transistors T1 to T3 may be an N-type transistor, and the others thereof may be P-type transistors.

Referring to FIG. 4A, the j-th first scan line SCLj may transfer a first scan signal SCj, and the j-th second scan line SSLj may transfer a second scan signal SSj. The i-th data line DLi transfers the data signal Di. The data signal Di may have a voltage level corresponding to the compensation image data C_DS (refer to FIG. 3) or the reference image data R_DS (refer to FIG. 3).

The first voltage line VL1 may transfer the first driving voltage ELVDD to the pixel circuit unit PXC, the second voltage line VL2 may transfer the second driving voltage ELVSS to a cathode (or a second terminal) of the light emitting element ED, and the third voltage line VL3 may transfer the initialization voltage VINT to the pixel circuit unit PXC.

The first transistor T1 includes a first electrode connected with the first voltage line VL1, a second electrode electrically connected with an anode (or a first terminal) of the light emitting element ED, and a gate electrode connected with a first end of the capacitor Cst. The first transistor T1 may transfer an emission current Ted to the light emitting element ED in response to the data signal Di transferred through the i-th data line DLi depending on a switching operation of the second transistor T2.

The second transistor T2 includes a first electrode connected with the i-th data line DLi, a second electrode connected with the gate electrode of the first transistor T1, and a gate electrode connected with the j-th first scan line SCLj. The second transistor T2 may be turned on depending on the first scan signal SCj transferred through the j-th first scan line SCLj and may transfer the data signal Di from the i-th data line DLi to the gate electrode of the first transistor T1.

The third transistor T3 includes a first electrode connected with the third voltage line VL3, a second electrode connected with the anode of the light emitting element ED, and a gate electrode connected with the j-th second scan line SSLj. The third transistor T3 may be turned on depending on the second scan signal SSj transferred through the j-th second scan line SSLj and may transfer the initialization voltage VINT to the anode of the light emitting element ED.

The first end of the capacitor Cst is connected with the gate electrode of the first transistor T1 as described above, and a second end of the capacitor Cst is connected with the second electrode of the first transistor T1. The structure of the pixel PXij according to an embodiment is not limited to the structure illustrated in FIG. 4A. In the pixel PXij, the number of transistors, the number of capacitors, and a connection relationship of the transistors and the capacitors may be variously changed or modified.

Referring to FIGS. 4A and 4B, a current Ids flowing from the first electrode of the first transistor T1 to the second electrode of the first transistor T1 may change depending on a voltage Vgs between the gate electrode and the second electrode of the first transistor T1.

The current-voltage characteristic of the first transistor T1 may vary depending on the voltage level of the data signal Di or the first driving voltage ELVDD.

In FIG. 4B, a first curve L11 shows the current-voltage characteristic of the first transistor T1 when the first driving voltage ELVDD has a first voltage level, and a second curve L12 shows the current-voltage characteristic of the first transistor T1 when the first driving voltage ELVDD has a second voltage level higher than the first voltage level.

As understood from FIG. 4B, as the voltage level of the first driving voltage ELVDD increases, the current Ids flowing from the first electrode of the first transistor T1 to the second electrode of the first transistor T1 increases. That is, the emission current led of the light emitting element ED may be controlled by adjusting the voltage level of the first driving voltage ELVDD.

Figure 5A:
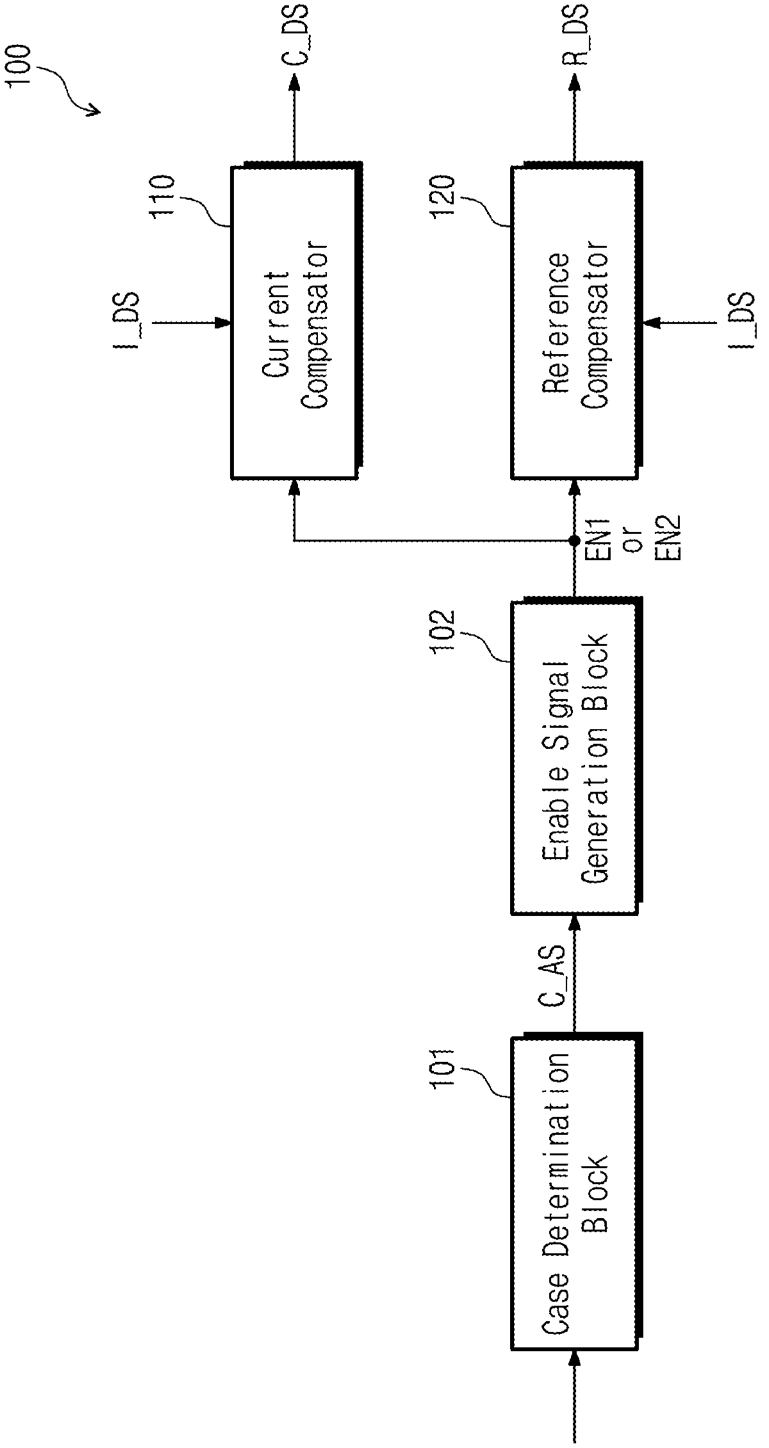
FIG. 5A is an internal block diagram of a driving controller according to an embodiment of the present disclosure.
Figure 5B:
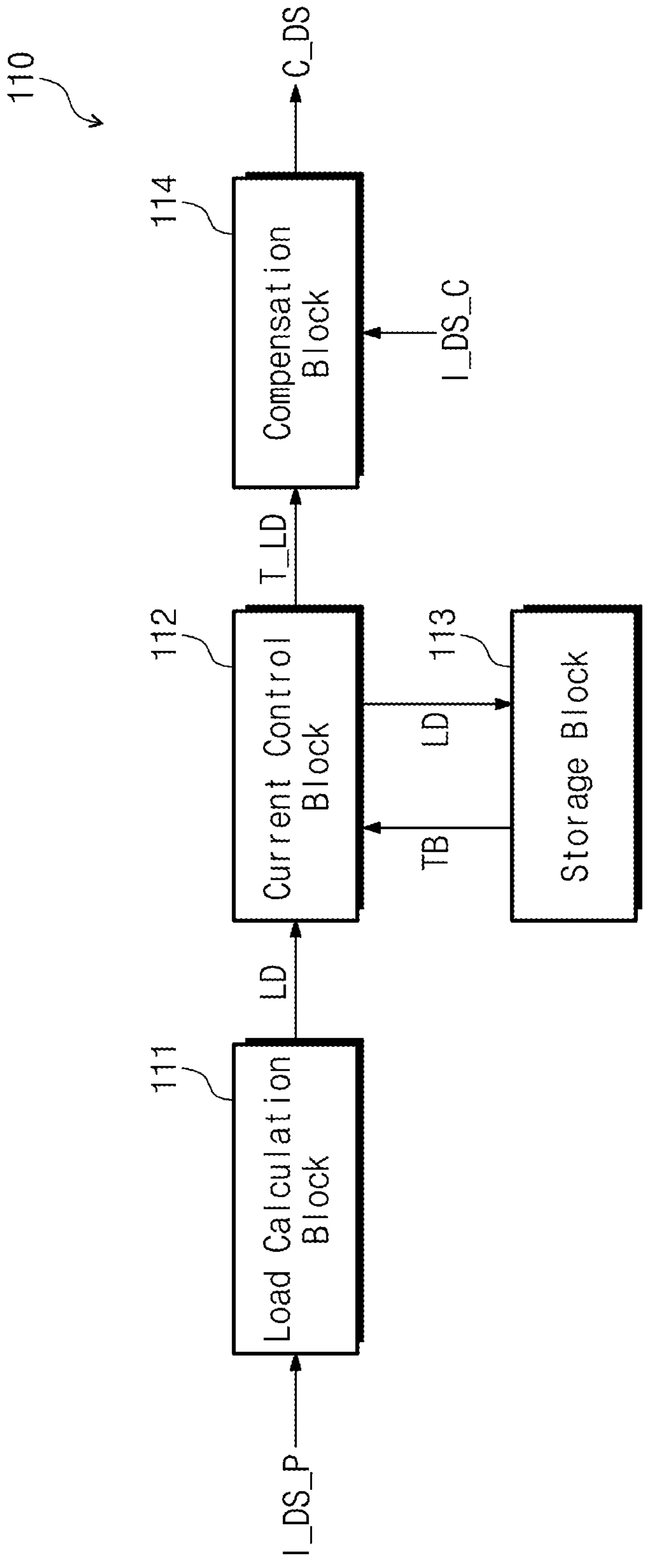
FIG. 5B is an internal block diagram of a current compensator according to an embodiment of the present disclosure.
Figure 6A:
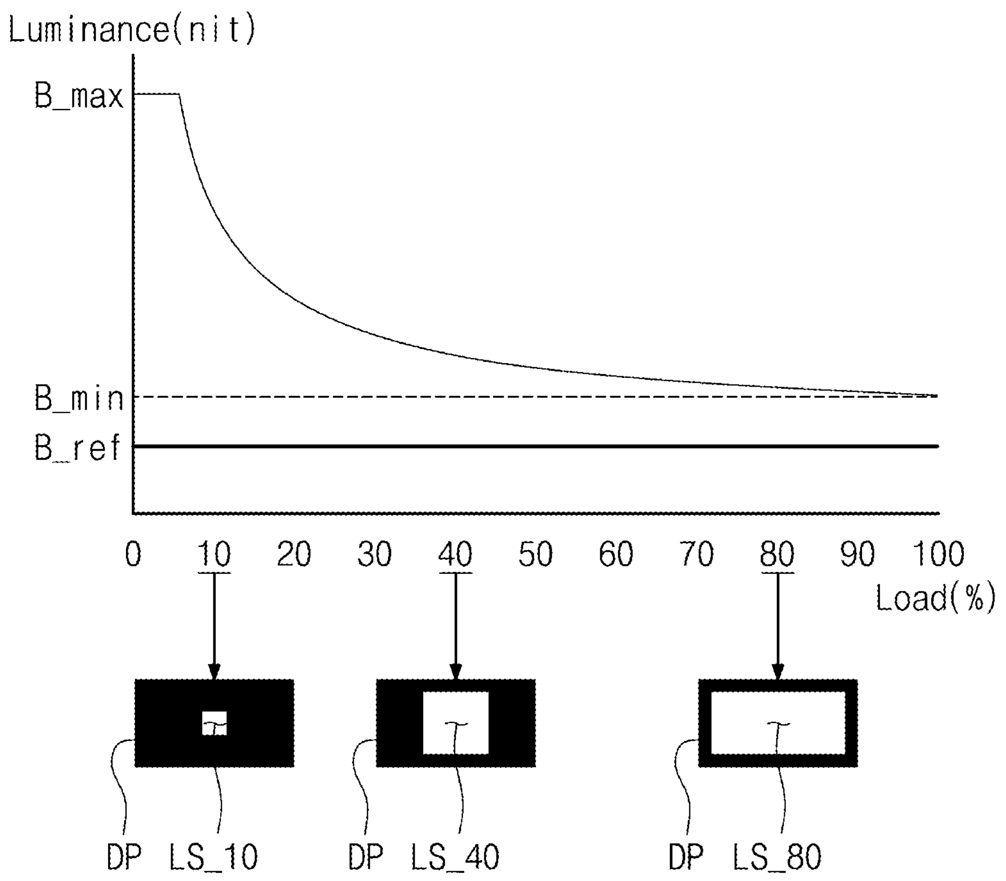
FIG. 6A is a graph illustrating a relationship between a load and target luminance, according to an embodiment of the present disclosure.
Figure 6B:
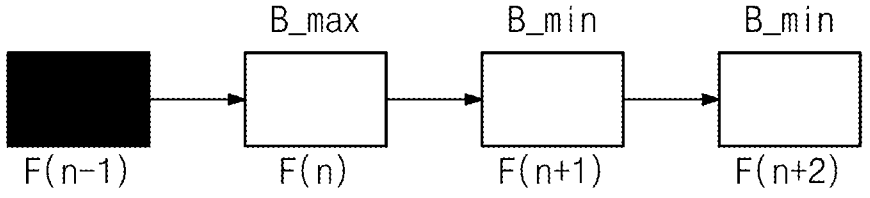
FIG. 6B is a diagram illustrating an image for each frame, which is displayed when a current compensator is turned on in a given case, according to an embodiment of the present disclosure.

FIG. 5A is an internal block diagram of a driving controller according to an embodiment of the present disclosure, and FIG. 5B is an internal block diagram of a current compensator according to an embodiment of the present disclosure. FIG. 6A is a graph illustrating a relationship between a load and target luminance, according to an embodiment of the present disclosure, and FIG. 6B is a diagram illustrating an image for each frame, which is displayed when a current compensator is turned on in a given case, according to an embodiment of the present disclosure.

Referring to FIGS. 3 and 5A, the driving controller 100 further includes a case determination block 101 and an enable signal generation block 102. Various kinds of signals necessary to determine the given cases may be supplied to the case determination block 101. The given cases may include a case in which a reference image having a specific grayscale (e.g., a black image having a black grayscale) is displayed during a given time period. As an embodiment of the present disclosure, the cases may include a case (hereinafter referred to as a "first case") in which the transition to a normal operation period is made after the reference image is displayed during a given standby period from a time when the power is applied. Also, the cases may further include a case (hereinafter referred to as a "second case") in which the transition to the normal operation period is made after the reference image is displayed during the given standby period from a time when a display setting condition such as a resolution of a display device is changed. Also, the cases may further include a case (hereinafter referred to as a "third case") in which the transition to the normal operation period is made after the reference image is displayed during the given standby period from a time when there is determined that the input image signal RGB and the control signal CTRL including various kinds of signals are not input to the display device or are distorted.

The case determination block 101 outputs a case signal C_AS that is activated in the setting mode coinciding with at least one of the cases and is deactivated in the normal mode not coinciding with at least one of the cases. The enable signal generation block 102 generates an enable signal EN1 or EN2 for enabling one of the current compensator 110 and the reference compensator 120 in response to the case signal C_AS. The enable signal generation block 102 generates the first enable signal EN1 in response to the case signal C_AS deactivated in the normal mode and generates the second enable signal EN2 in response to the case signal C_AS activated in the setting mode.

Each of the current compensator 110 and the reference compensator 120 may receive the first or second enable signal EN1 or EN2 from the enable signal generation block 102. The current compensator 110 is turned on in response to the first enable signal EN1 activated in the normal mode and is turned off in response to the second enable signal EN2 activated in the setting mode. The reference compensator 120 is turned on in response to the second enable signal EN2 activated in the setting mode and is turned off in response to the first enable signal EN1 activated in the normal mode.

At least one of the current compensator 110 and the reference compensator 120 may be embedded in the driving controller 100. However, the present disclosure is not limited thereto. At least one of the current compensator 110 and the reference compensator 120 may be disposed as a component independent fromthe driving controller 100. Alternatively, at least one of the current compensator 110 and the reference compensator 120 may be embedded in the main controller.

Referring to FIGS. 3, 5A, and 5B, the current compensator 110 includes a load calculation block 111, a current control block 112, a storage block 113, and a compensation block 114.

The load calculation block 111 may directly receive the input image signal RGB (refer to FIG. 3) or may receive image data LDS (refer to FIG. 3) which is converted from the input image signal RGB. The image data I_DS may be input in units of frame. The load calculation block 111 calculates a load LD for one frame (e.g., a previous frame) based on the image data I_DS (e.g., previous image data I_DS_P). The current control block 112 receives the load LD from the load calculation block 111. The current control block 112 selects target luminance TB corresponding to the received load LD and converts the load LD into a target load T_LD by the target luminance TB.

A lookup table in which target luminance for each magnitude of the load LD is stored may be included in the storage block 113. The current control block 112 may select the target luminance TB, which corresponds to the magnitude of the load LD calculated based on the previous image data I_DS_P of the previous frame, from among the plurality of target luminance.

Referring to FIG. 6A, the load LD may have a size ranging from 0% to 100%. For example, that the load LD is 0% may correspond to that the entire screen of the display panel DP displays a black image having a black grayscale. Also, that the load LD is 10% may correspond to that only 10% (refer to box LS_10) of the entire screen of the display panel DP displays an image (hereinafter referred to as a "white image") having a white grayscale and 90% of the entire screen displays a black image. That the load LD is 40% may correspond to that only 40% (refer to box LS_40) of the entire screen of the display panel DP displays a white image and 60% of the entire screen may display a black image. That the load LD is 80% may correspond to that only 80% (refer to box LS_80) of the entire screen of the display panel DP displays a white image and 20% of the entire screen may display a black image. That is, as the load LD increases, the area of the box in which the white image is displayed may increase.

When the load LD is 0%, the target luminance TB may have a maximum luminance value B_max. When the load LD is 100%, the target luminance TB may have a minimum luminance value B_min. As an example of the present disclosure, the maximum luminance value B_max may be about 1000 nits, and the minimum luminance value B_min may be about 250 nits.

The current control block 112 may adjust the magnitude of the load LD based on the target luminance TB, so as to be converted into the target load T_LD. For example, the target load T_LD may be smaller in magnitude than the load LD.

The compensation block 114 may receive the target load T_LD from the current control block 112. Also, the compensation block 114 may receive current image data I_DS_C and may generate the compensation image data C_DS by compensating for the current image data I_DS_C based on the target load T_LD. For example, the compensation block 114 may determine a compensation scale based on the target load T_LD and may generate the compensation image data C_DS by scaling the grayscale of the current image data I_DS_C down as much as the compensation scale. Accordingly, luminance (i.e., the target luminance TB) of an image displayed by the compensation image data C_DS may be lower than luminance of an image displayed by the current image data I_DS_C. Accordingly, in the case of displaying the image by the compensation image data C_DS, the driving current Ie, (refer to FIG. 3) of the display panel DP may decrease. This may mean that the total power consumption of the display device DD is reduced through the operation (hereinafter referred to as a "current compensation operation") of the current compensator 110.

However, a time corresponding to one frame may be required to generate the compensation image data C_DS by the current compensator 110. Accordingly, in a frame (or a non-compensation frame) that is initiated for the first time after the load LD is changed, the current compensation operation may not be applied to the display panel DP.

Referring to FIGS. 5B, 6A, and 6B, during a previous frame F(n−1), the reference image (e.g., a black image) may be displayed in the entire screen of the display panel DP. The current compensator 110 generates the compensation image data C_DS based on the previous image data I_DS_P corresponding to the previous frame F(n−1). However, when the load LD of the previous image data I_DS_P is 0%, even though the current image data I_DS_C has luminance corresponding to the maximum luminance value B_max, the current compensator 110 may generate the compensation image data C_DS having the target luminance corresponding to the maximum luminance value B_max without actual correction. Accordingly, during a current frame F(n), the white image whose target luminance corresponds to about 1000 nit may be displayed in the display panel DP. An example in which a load is 0% when the reference image is a black image is described in the specification, but the reference load of the reference image is not limited to 0%. For example, the load of the reference image may be greater than 0% and may be smaller than or equal to a given reference load.

Afterwards, the current compensator 110 generates the compensation image data C_DS based on the current image data I_DS_C corresponding to the current frame F(n). Because the load LD of the current image data I_DS_C is changed to 100%, the current compensator 110 may compensate for next image data and may generate the compensation image data C_DS whose target luminance corresponds to the minimum luminance value B_min. Accordingly, during a next frame F(n+1), the white image whose target luminance corresponds to 250 nit may be displayed in the display panel DP. Even in anafter next frame F(n+2), the white image whose target luminance corresponds to 250 nit may be maintained in the display panel DP. Herein, the current frame F(n) may correspond to a non-compensation frame. As described above, even though the load LD is changed, there may be a first frame (or a non-compensation frame) to which the current compensation operation is not applied by the current compensator 110; in this case, a flicker may be visually perceived.

Accordingly, the reference compensator 120 may be activated in the setting mode coinciding with the given cases such that luminance of the non-compensation frame is lowered. This may mean that the flicker phenomenon is removed and the power consumption is reduced.

Figure 7A:
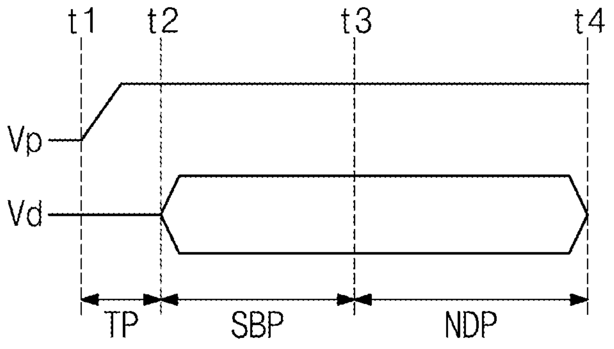
FIG. 7A is a waveform diagram describing a first case being one of given cases according to an embodiment of the present disclosure.
Figure 7B:
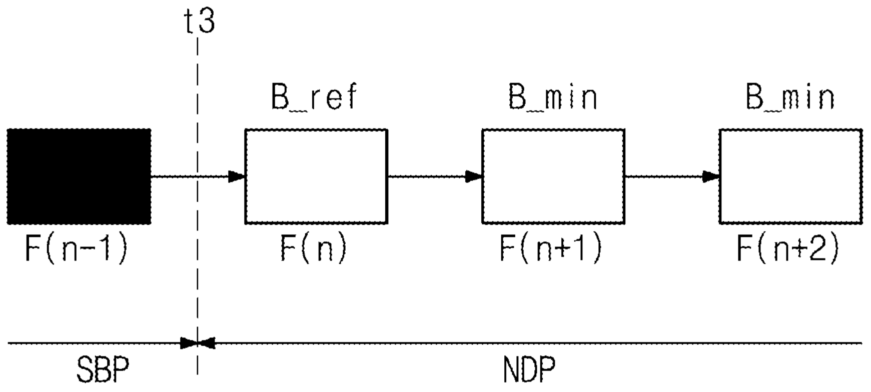
FIG. 7B is a diagram illustrating an image for each frame which is displayed in the first case according to an embodiment of the present disclosure.

FIG. 7A is a waveform diagram describing a first case being one of given cases according to an embodiment of the present disclosure, and FIG. 7B is a diagram illustrating an image for each frame, which is displayed in the first case according to an embodiment of the present disclosure.

Referring to FIGS. 5A, 7A, and 7B, the display panel DP (referring to FIG. 3) may not operate from a first time point t1 when a power is supplied to the display device DD (referring to FIG. 3) to a second time point t2. As an embodiment of the present disclosure, a time period from the first time point t1 to the second time point t2 may be referred to as a "transition period TP". When the transition period TP ends, a standby period SBP may be initiated from the second time point t2. The standby period SBP may be defined as a time period in which a reference image having a specific grayscale (e.g., a black image having a black grayscale) is displayed before a normal image is displayed in the display panel DP. The reference image may be displayed during a time period from the second time point t2 to a third time point t3. When the standby period SBP ends, a normal operation period NDP may be initiated. The normal operation period NDP may correspond to a time period in which the display panel DP displays a desired image normally. The normal operation period NDP may be maintained until a fourth time point t4 when the power is turned off.

After the standby period SBP ends, the normal operation period NDP may be initiated; the setting mode may be executed in a first period of the normal operation period NDP, and the normal mode may be executed in a second period of the normal operation period NDP, which is different from the first period. As an embodiment of the present disclosure, the first period may include the first frame of the normal operation period NDP, and the second period may include the remaining frames other than the first frame.

The first frame (i.e., the current frame F(n)) of the normal operation period NDP may be defined as a non-compensation frame. According to the present disclosure, the display device DD may enter the setting mode at the third time point t3. In the setting mode, the first enable signal EN1 may be deactivated, and the second enable signal EN2 may be activated. Accordingly, in the setting mode, the current compensator 110 is turned off in response to the first enable signal EN1 deactivated, and the reference compensator 120 is turned on in response to the second enable signal EN2 activated.

In the setting mode, the reference compensator 120 may compensate for the image data LDS to output the reference image data R_DS with the reference luminance. Accordingly, even though the load LD of the previous image data I_DS_P is 0%, because the current compensator 110 does not operate in the current frame F(n), the display panel DP may display the white image whose reference luminance corresponds to a reference luminance value B_ref lower than the maximum luminance value B_max. As an embodiment of the present disclosure, the reference luminance value B_ref may be equal to or lower than the minimum luminance value B_min. For example, when the minimum luminance value B_min is about 250 nit, the reference luminance value B_ref may be a value between about 200 nit and about 250 nit.

As an embodiment of the present disclosure, when the next frame F(n+1) is initiated, the display device DD may enter the normal mode. In the normal mode, the first enable signal EN1 may be activated, and the second enable signal EN2 may be deactivated. Accordingly, in the normal mode, the current compensator 110 is turned on in response to the first enable signal EN1 activated, and the reference compensator 120 is turned off in response to the second enable signal EN2 deactivated.

Because the load LD of the current image data LDS is 100%, the current compensator 110 may compensate for next image data and may generate the compensation image data C_DS whose target luminance corresponds to the minimum luminance value B_min. Accordingly, during the next frame F(n+1), the white image whose target luminance corresponds to about 250 nit may be displayed in the display panel DP. Even in the after next frame F(n+2), the white image whose target luminance corresponds to about 250 nit may be maintained in the display panel DP.

As described above, as the reference compensator 120 is activated in the given cases such that luminance of a non-compensation frame is lowered, the flicker phenomenon may be removed, and the power consumption may be reduced.

The first case is described with reference to FIGS. 7A and 7B as an example; however, the display device DD may operate as in the second and third cases, and thus, there may be solved a decrease in the quality of display and an increase in power consumption that are caused due to the non-compensation frame.

Figure 8A:
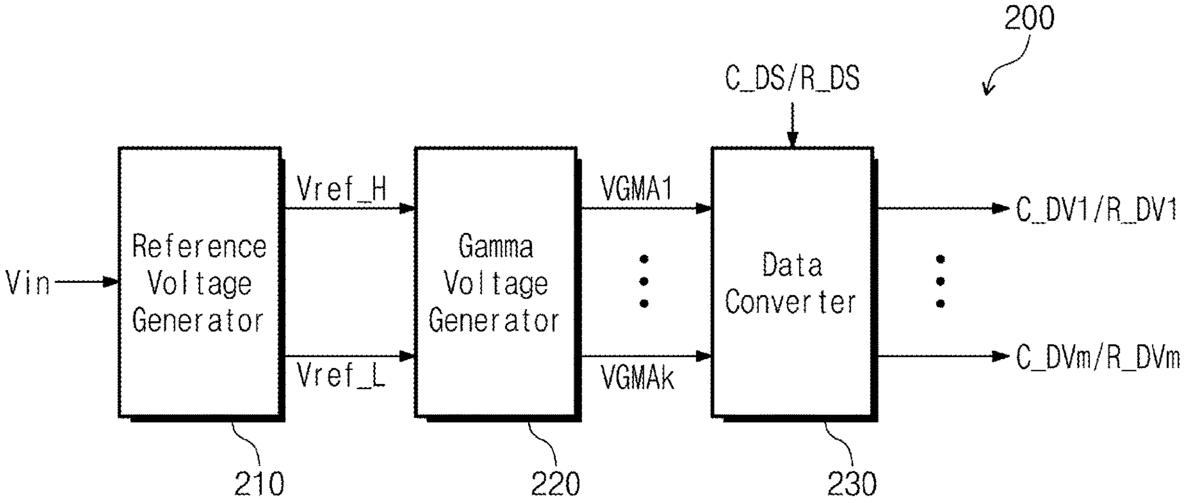
FIG. 8A is a block diagram of a data driver illustrated in FIG. 3.
Figure 8B:
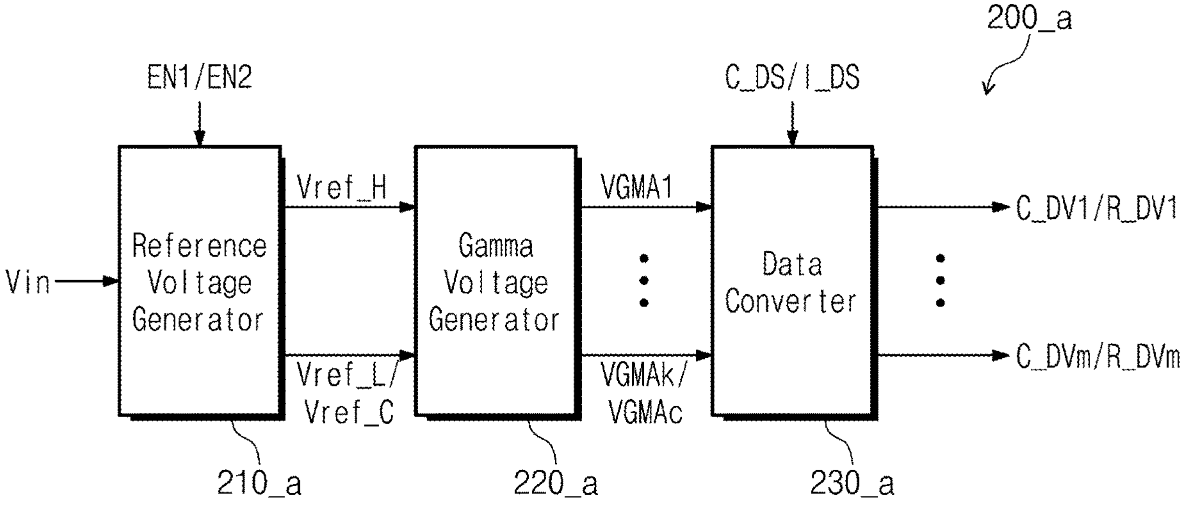
FIG. 8B is a block diagram of a data driver according to an embodiment of the present disclosure.

FIG. 8A is a block diagram of a data driver illustrated in FIG. 3, and FIG. 8B is a block diagram of a data driver according to an embodiment of the present disclosure.

Referring to FIG. 8A, the data driver 200 includes a reference voltage generator 210, a gamma voltage generator 220, and a data converter 230. The reference voltage generator 210 receives an input voltage Vin and generates a gamma reference voltage based on the input voltage Vin. According to an embodiment of the present disclosure, the gamma reference voltage includes a first gamma reference voltage Vref_H and a second gamma reference voltage Vref_L. The first gamma reference voltage Vref_H may have a voltage level higher than the second gamma reference voltage Vref_L. For example, the first gamma reference voltage Vref_H may be about 7 V, and the second gamma reference voltage Vref_L may be about 1 V.

The gamma voltage generator 220 receives the first gamma reference voltage Vref_H and the second gamma reference voltage Vref_L from the reference voltage generator 210. The gamma voltage generator 220 generates a plurality of gamma voltages VGMA1 to VGMAk by the first gamma reference voltage Vref_H and the second gamma reference voltage Vref_L.

The data converter 230 receives the plurality of gamma voltages VGMA1 to VGMAk from the gamma voltage generator 220. The data converter 230 converts the compensation image data C_DS or the reference image data R_DS into data voltages by the plurality of gamma voltages VGMA1 to VGMAk. That is, the driving controller 100 (in particular, the current compensator 110) supplies the compensation image data C_DS to the data driver 200 (in particular, the data converter 230) in the normal mode, and the driving controller 100 (in particular, the reference compensator 120) supplies the reference image data R_DS to the data driver 200 in the setting mode. Herein, the data voltages converted from the compensation image data C_DS may be referred to as "compensation data voltages C_DV1 to C_DVm", and the data voltages converted from the reference image data R_DS may be referred to as "reference data voltages R_DV1 to R_DVm".

The data driver 200 outputs the compensation data voltages C_DV1 to C_DVm to the plurality of data lines DL1 to DLm provided in the display panel DP (refer to FIG. 3) in the normal mode and outputs the reference data voltages R_DV1 to R_DVm to the plurality of data lines DL1 to DLm in the setting mode.

Referring to FIG. 8B, a data driver 200_*a* according to an embodiment of the present disclosure includes a reference voltage generator 210_*a*, a gamma voltage generator 220_*a*, and a data converter 230_*a*.

The reference voltage generator 210_*a* may receive the input voltage Vin and may receive the first and second enable signals EN1 and EN2 from the driving controller 100. The reference voltage generator 210_*a* generates the first gamma reference voltage Vref_H and the second gamma reference voltage Vref_L in response to the first enable signal EN1 activated in the normal mode. The reference voltage generator 210_*a* generates the first gamma reference voltage Vref_H and a compensation reference voltage Vref_C in response to the second enable signal EN2 activated in the setting mode. The compensation reference voltage Vref_C may be a voltage that is obtained by compensating for the second gamma reference voltage Vref_L. As an embodiment of the present disclosure, the compensation reference voltage Vref_C may have a voltage level higher than the second gamma reference voltage Vref_L. The reference voltage generator 210_*a* may generate the compensation reference voltage Vref_C obtained by compensating for only the second gamma reference voltage Vref_L in the setting mode, but the present disclosure is not limited thereto. Alternatively, the reference voltage generator 210_*a* may compensate for both the first gamma reference voltage Vref_H and the second gamma reference voltage Vref_L.

The gamma voltage generator 220_*a* receives the first gamma reference voltage Vref_H and the second gamma reference voltage Vref_L from the reference voltage generator 210_*a* in the normal mode. The gamma voltage generator 220_*a* generates the plurality of gamma voltages VGMA1 to VGMAk by the first gamma reference voltage Vref_H and the second gamma reference voltage Vref_L. Also, the gamma voltage generator 220_*a* receives the first gamma reference voltage Vref_H and the compensation reference voltage Vref_C from the reference voltage generator 210_*a* in the setting mode. The gamma voltage generator 220_*a* generates a plurality of compensation gamma voltages VGMA1 to VGMAc by the first gamma reference voltage Vref_H and the compensation reference voltage Vref_C.

The data converter 230_*a* receives the plurality of gamma voltages VGMA1 to VGMAk from the gamma voltage generator 220_*a* in the normal mode. The data converter 230_*a* converts the compensation image data C_DS into data voltages by the plurality of gamma voltages VGMA1 to VGMAk. The data voltages converted from the compensation image data C_DS are referred to as "compensation data voltages C_DV1 to C_DVm".

The data converter 230_*a* receives the plurality of compensation gamma voltages VGMA1 to VGMAc from the gamma voltage generator 220_*a* in the setting mode. The data converter 230_*a* converts the image data I_DS into data voltages by the plurality of compensation gamma voltages VGMA1 to VGMAc. That is, the data voltages converted from the image data I_DS by the compensation gamma voltages VGMA1 to VGMAc in the setting mode may be referred to as "reference data voltages R_DV1 to R_DVm".

The data driver 200 outputs the compensation data voltages C_DV1 to C_DVm to the plurality of data lines DL1 to DLm provided in the display panel DP (refer to FIG. 3) in the normal mode and outputs the reference data voltages R_DV1 to R_DVm to the plurality of data lines DL1 to DLm in the setting mode.

Figure 9:
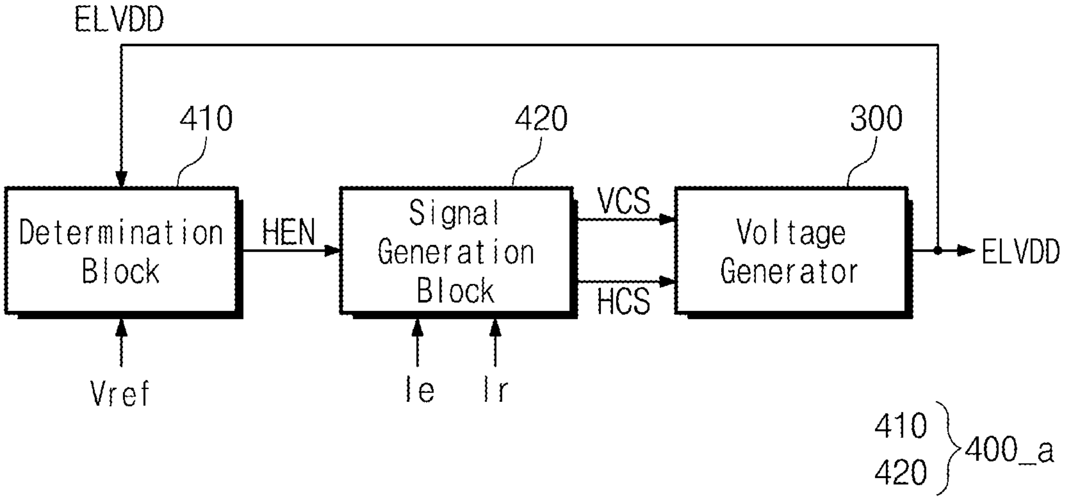
FIG. 9 is a block diagram for describing operations of a voltage controller and a voltage generator according to an embodiment of the present disclosure.
Figure 10A:
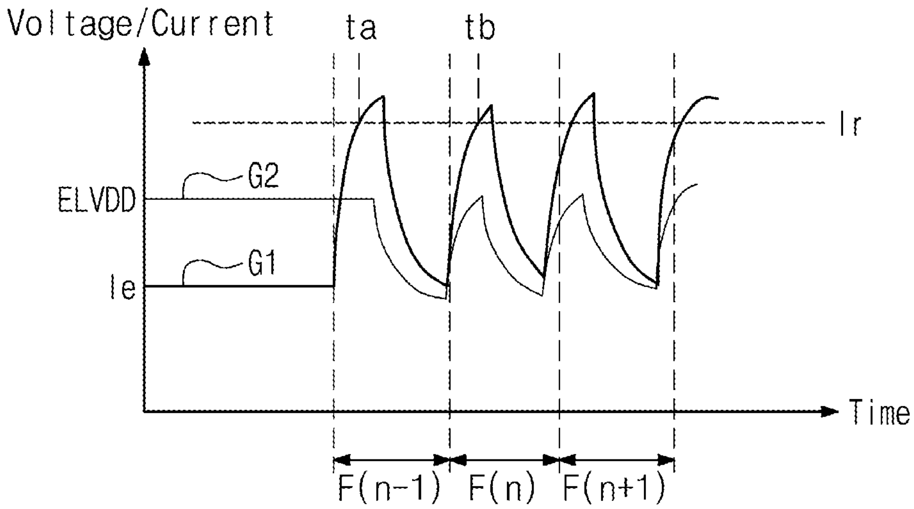
FIGS. 10A and 10B are waveform diagrams illustrating how a first driving voltage changes depending on a voltage control signal and a holding control signal, according to an embodiment of the present disclosure.
Figure 10B:
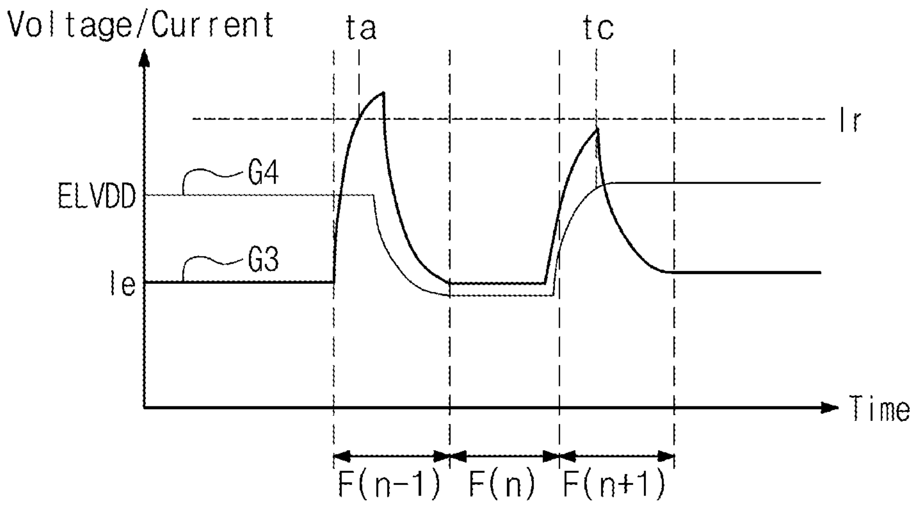

FIG. 9 is a block diagram for describing operations of a voltage controller and a voltage generator according to an embodiment of the present disclosure, and FIGS. 10A and 10B are waveform diagrams illustrating how a first driving voltage changes depending on a voltage control signal and a holding control signal, according to an embodiment of the present disclosure.

Referring to FIG. 9, a voltage controller 400_*a* according to an embodiment of the present disclosure includes a determination block 410 and a signal generation block 420.

The determination block 410 receives the first driving voltage ELVDD as a feedback, compares the first driving voltage ELVDD and a given reference driving voltage Vref, and determines whether the first driving voltage ELVDD decreases. The reference driving voltage Vref may have the same voltage level as the first driving voltage ELVDD applied to the display panel DP (refer to FIG. 3) in a previous frame.

The determination block 410 outputs a holding enable signal HEN depending on a determination result. As an embodiment of the present disclosure, when it is determined that the first driving voltage ELVDD is decreased, the holding enable signal HEN may be activated; when it is determined that the first driving voltage ELVDD is not decreased, the holding enable signal HEN may be deactivated.

The signal generation block 420 receives the holding enable signal HEN from the determination block 410. When the deactivated holding enable signal HEN is applied to the signal generation block 420, the signal generation block 420 compares the driving current Ie and a given reference current Ir to output the voltage control signal VCS. When the activated holding enable signal HEN is applied to the signal generation block 420, the signal generation block 420 outputs a holding control signal HCS instead of the voltage control signal VCS.

The voltage generator 300 receives the voltage control signal VCS or the holding control signal HCS from the voltage controller 400_*a*. The voltage generator 300 may vary the first driving voltage ELVDD depending on the voltage control signal VCS or may maintain the first driving voltage ELVDD in response to the holding control signal HCS.

In FIGS. 9 and 10A, a first graph G1 shows the driving current Ie, and a second graph G2 shows the first driving voltage ELVDD. In the previous frame F(n−1), the voltage controller 400_*a* outputs the voltage control signal VCS at a first exceeding time point ta when the driving current Ie exceeds the reference current Ir. Accordingly, the first driving voltage ELVDD may fall at the first exceeding time ta. As the first driving voltage ELVDD falls, the driving current Ie gradually decreases. Afterwards, in the case of displaying a high-luminance image in the current frame F(n), the voltage controller 400_*a* may again increase the first driving voltage ELVDD in the current frame F(n). In this case, the driving current Ie again increases by the first driving voltage ELVDD that increases. The driving current Ie again exceeds the reference current Ir at a second exceeding time point tb, and the first driving voltage ELVDD again falls from the second exceeding time point tb. As described above, when the voltage controller 400_*a* controls the first driving voltage ELVDD only through the voltage control signal VCS, the process in which the first driving voltage ELVDD is adjusted may be repeated.

The voltage controller 400_*a* may further generate the holding control signal HCS such that there is not repeated the process in which the first driving voltage ELVDD is adjusted. In detail, in FIGS. 9 and 10B, a third graph G3 shows the driving current Ie, and a fourth graph G4 shows the first driving voltage ELVDD. In the previous frame F(n−1), the voltage controller 400_*a* outputs the voltage control signal VCS at the first exceeding time ta when the driving current Ie exceeds the reference current Ir. Accordingly, the first driving voltage ELVDD may fall at the first exceeding time point ta. As the first driving voltage ELVDD falls, the driving current Ie gradually decreases. Afterwards, as the holding enable signal HEN is activated, the voltage controller 400_*a* may output the holding control signal HCS instead of the voltage control signal VCS. Accordingly, even though a high-luminance image is displayed in the current frame F(n), in response to the holding control signal HCS, the voltage generator 300 may maintain the first driving voltage ELVDD without change in the current frame F(n). That is, in the current frame F(n), because the first driving voltage ELVDD is maintained in a state of being decreased, the driving current Ie is also maintained in a state of being decreased.

Afterwards, in the next frame F(n+1), even though the first driving voltage ELVDD again increases, the driving current Ie does not exceed the reference current Jr by the first driving voltage ELVDD thus increased. In particular, at a third time point tc when the driving current Ie is measured, the driving current Ie of a partial period of the current frame F(n) may be applied to the driving current Ie of the third time point tc. However, because the driving current Ie of the current frame F(n) is maintained in a low state, the driving current Ie measured at the third time point tc may not exceed the reference current Ir. Accordingly, the first driving voltage ELVDD may be maintained at a uniform level after the third time point tc. As described above, when the voltage controller 400_*a* controls the first driving voltage ELVDD in response to the voltage control signal VCS or the holding control signal HCS, there may be removed a defect in which there is repeated the process in which the first driving voltage ELVDD is adjusted.

An example in which the holding control signal HCS is activated only during one frame (i.e., the current frame F(n)) is illustrated in FIG. 10B, but the present disclosure is not limited thereto. When the holding control signal HCS is activated during two frames, the first driving voltage ELVDD may be maintained without change during the current frame F(n) and the next frame F(n+1).

Figure 11:
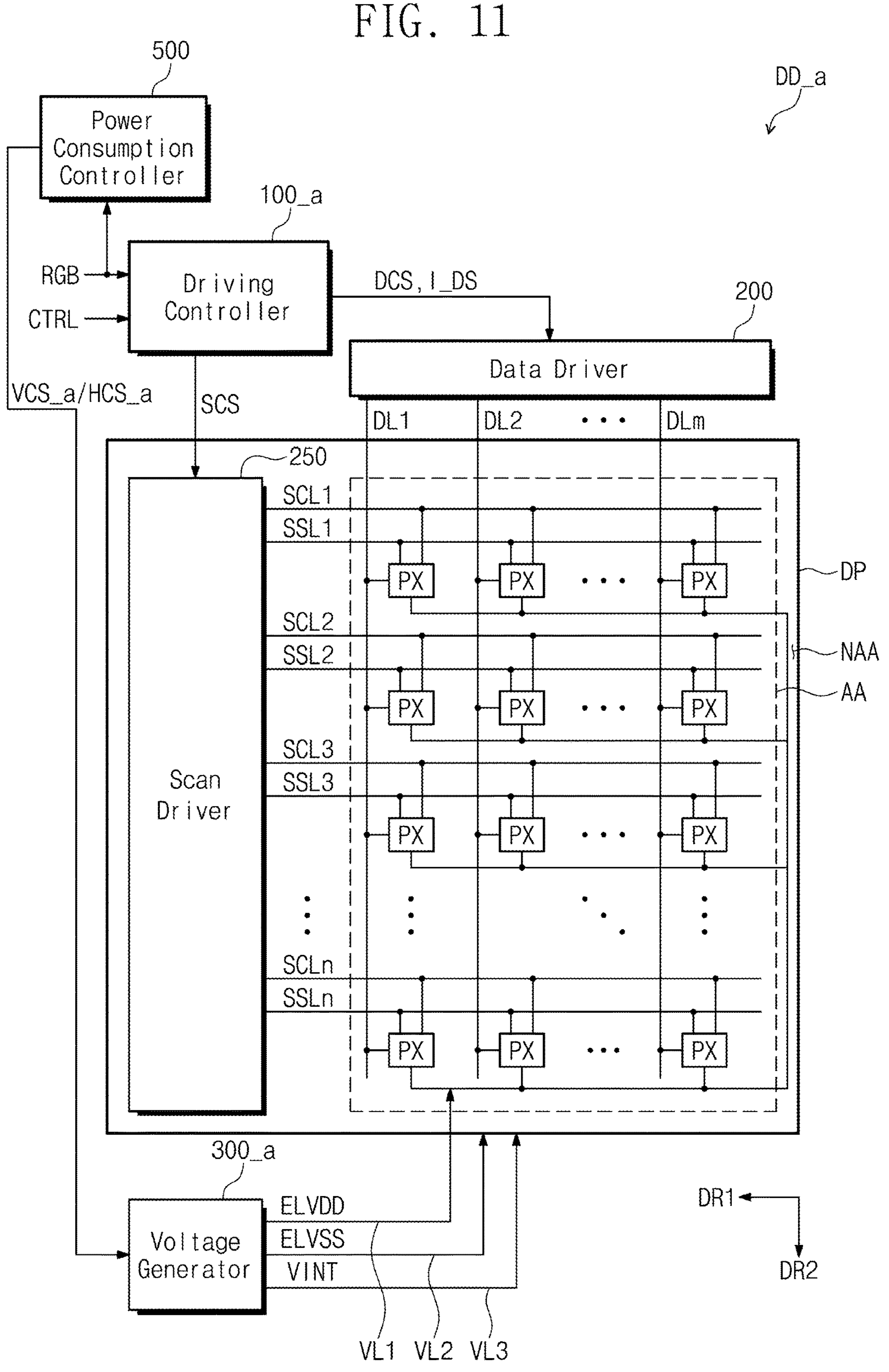
FIG. 11 is a block diagram of a display device according to an embodiment of the present disclosure.
Figure 12A:
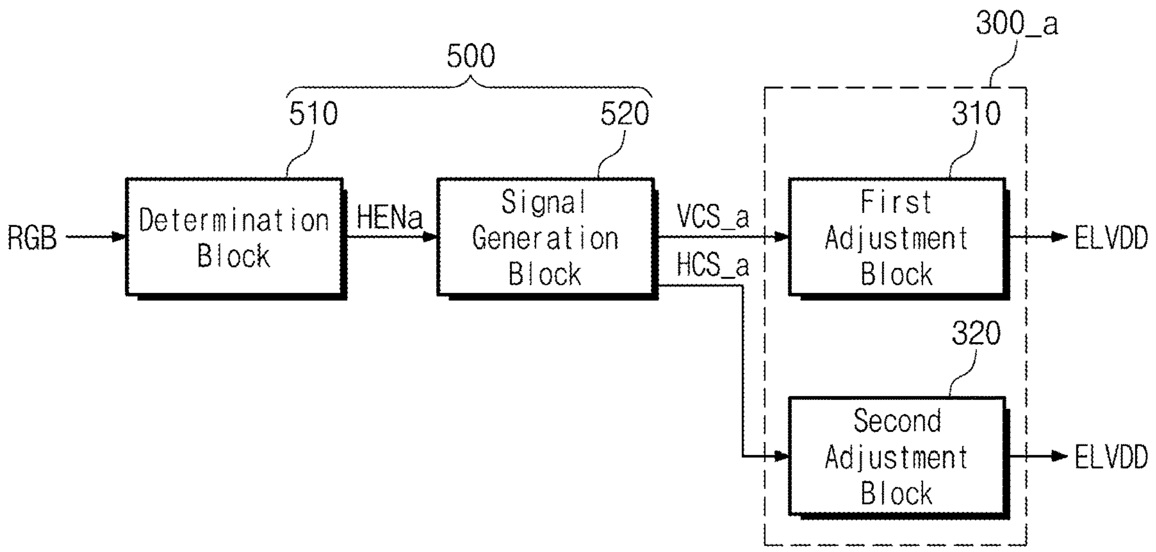
FIG. 12A is a block diagram for describing operations of a power consumption controller and a voltage generator according to an embodiment of the present disclosure.
Figure 12B:
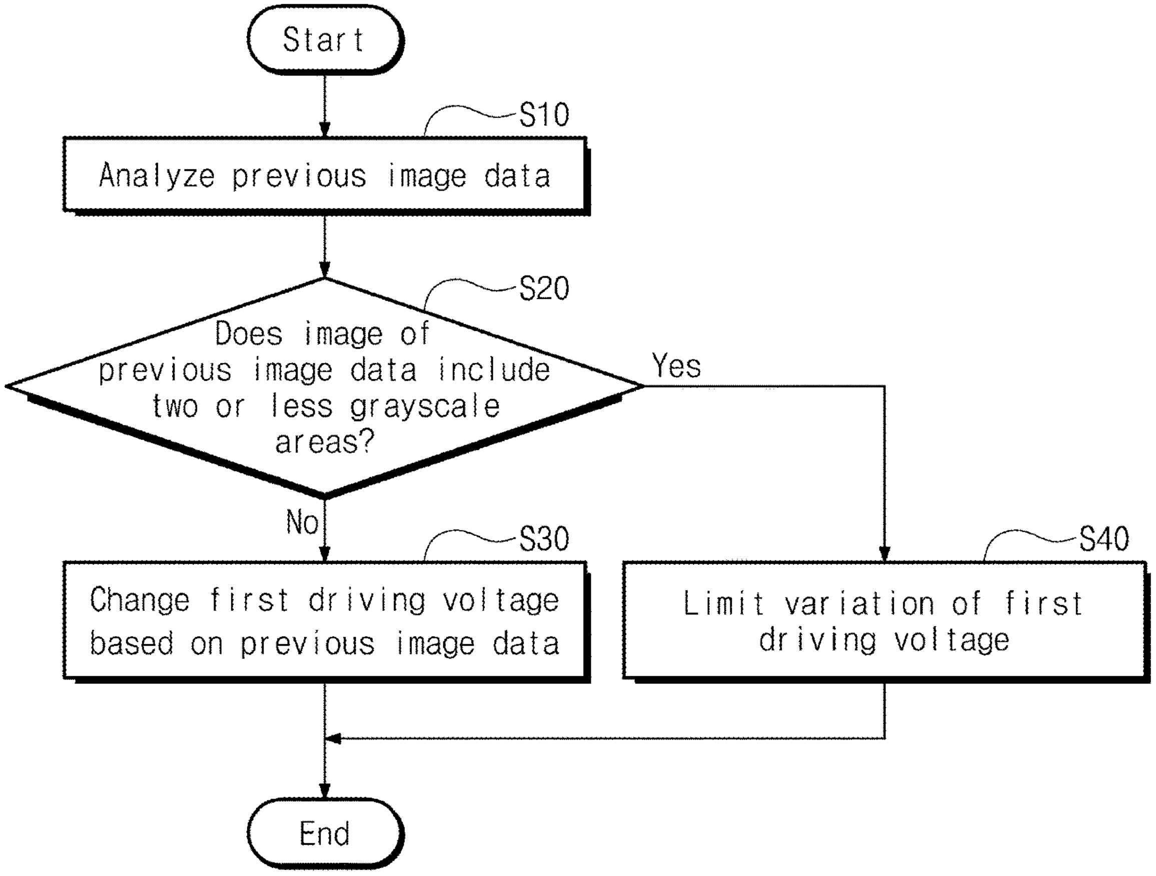
FIG. 12B is a flowchart for describing operations of a power consumption controller and a voltage generator according to an embodiment of the present disclosure.

FIG. 11 is a block diagram of a display device according to an embodiment of the present disclosure, and FIG. 12A is a block diagram for describing operations of a power consumption controller and a voltage generator according to an embodiment of the present disclosure. FIG. 12B is a flowchart for describing operations of a power consumption controller and a voltage generator according to an embodiment of the present disclosure. Components, which are identical to the components illustrated in FIG. 3, from among components illustrated in FIG. 11 are marked by the same reference numerals/signs, and thus, additional description will be omitted to avoid redundancy.

Referring to FIGS. 11, 12A, and 12B, a display device DD_a according to an embodiment of the present disclosure may include a driving controller 100_*a*, the data driver 200, the scan driver 250, a power consumption controller 500, a voltage generator 300_*a*, and the display panel DP.

The power consumption controller 500 may receive the input image signal RGB and may output a voltage control signal VCS_a or a holding control signal HCS_a based on the input image signal RGB. As an example of the present disclosure, the power consumption controller 500 may include a determination block 510 and a signal generation block 520. The determination block 510 may directly receive the input image signal RGB or may receive the image data I_DS converted from the input image signal RGB from the driving controller 100_*a*. The image data I_DS may be named differently depending on a corresponding frame. That is, the image data I_DS converted from the input image signal RGB received during the previous frame F(n−1) is referred to as "previous image data", and the image data I_DS converted from the input image signal RGB received during the current frame F(n) may be referred to as "current image data".

The determination block 510 determines whether a previous image coincides with a given grayscale pattern condition, based on the previous image data (S10), and outputs a holding enable signal HENa depending on a determination result (S20). As an embodiment of the present disclosure, the grayscale pattern condition may refer to a condition in which an image displayed in the display panel DP includes two or less grayscale areas. When the image displayed in the display panel DP includes three or more grayscale areas, the display device DD_a may control the first driving voltage ELVDD in the normal mode; when the image displayed in the display panel DP includes two or less grayscale areas, the display device DD_a may control the first driving voltage ELVDD in a response speed enhancement mode. The grayscale pattern condition will be described in detail with reference to FIGS. 14A, 14B, and 14C.

The holding enable signal HENa may be a signal that is deactivated in the normal mode and is activated in the response speed enhancement mode. The signal generation block 520 generates the voltage control signal VCS_a or the holding enable signal HENa in response to the holding enable signal HENa. In the normal mode, the signal generation block 520 outputs the voltage control signal VCS_a in response to the deactivated holding enable signal HENa. In the response speed enhancement mode, the signal generation block 520 outputs the holding control signal HCS_a in response to the activated holding enable signal HENa. In the normal mode, the signal generation block 520 generates the voltage control signal VCS_a based on maximum image data having maximum luminance from among the previous image data (S30). The voltage generator 300_*a* may include a first adjustment block 310 and a second adjustment block 320. The first adjustment block 310 may be activated in the normal mode; in response to the voltage control signal VCS_a, the first adjustment block 310 may maintain the first driving voltage ELVDD or may change the first driving voltage ELVDD as much as a first variation or more (S30). In the response speed enhancement mode, the signal generation block 520 generates the holding control signal HCS_a for the purpose of limiting the variation of the first driving voltage ELVDD (S40). The second adjustment block 320 may be activated in the response speed enhancement mode; in response to the holding control signal HCS_a, the second adjustment block 320 may change first driving voltage ELVDD as much as a second variation or less (S40). Herein, the first variation may be greater than the second variation.

Figure 13A:
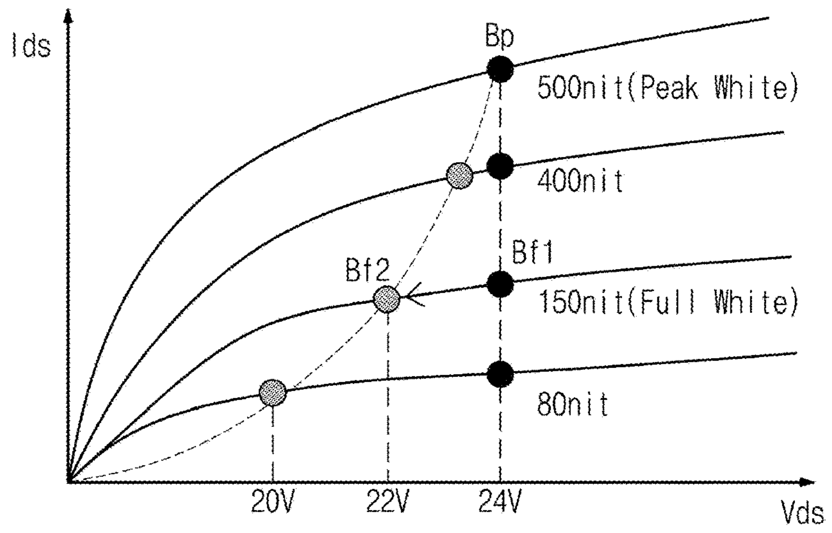
FIGS. 13A, 13B, and 13C are diagrams illustrating a first driving voltage and a current characteristic of a first transistor, according to an embodiment of the present disclosure.
Figure 13B:
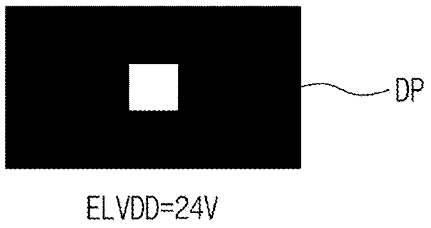
Figure 13C:
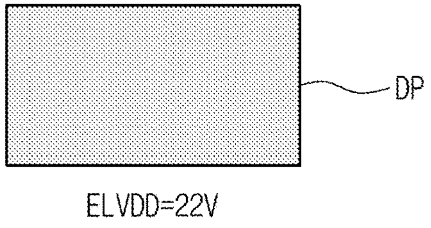

FIGS. 13A, 13B, and 13C are diagrams illustrating a first driving voltage and a current characteristic of a first transistor, according to an embodiment of the present disclosure.

Referring to FIGS. 13A, 13B, and 13C, as a voltage Vds (hereinafter referred to as a "drain-source voltage") between the first electrode and the second electrode of the first transistor T1 (refer to FIG. 1) increases, the current Ids (hereinafter referred to as a "drain-source current") flowing from the first electrode to the second electrode may increase.

The drain-source voltage Vds may change depending on the first driving voltage ELVDD. Compared to the case where the first driving voltage ELVDD has a voltage level of about 24 V, when the first driving voltage ELVDD has a voltage level of about 22 V or about 20 V, the drain-source voltage Vds may decrease, and thus, the drain-source current Ids of each pixel PX (refer to FIG. 11) may decrease. This may mean that the total power consumption of the display device DD_a (refer to FIG. 11) is reduced.

Figure 14A:
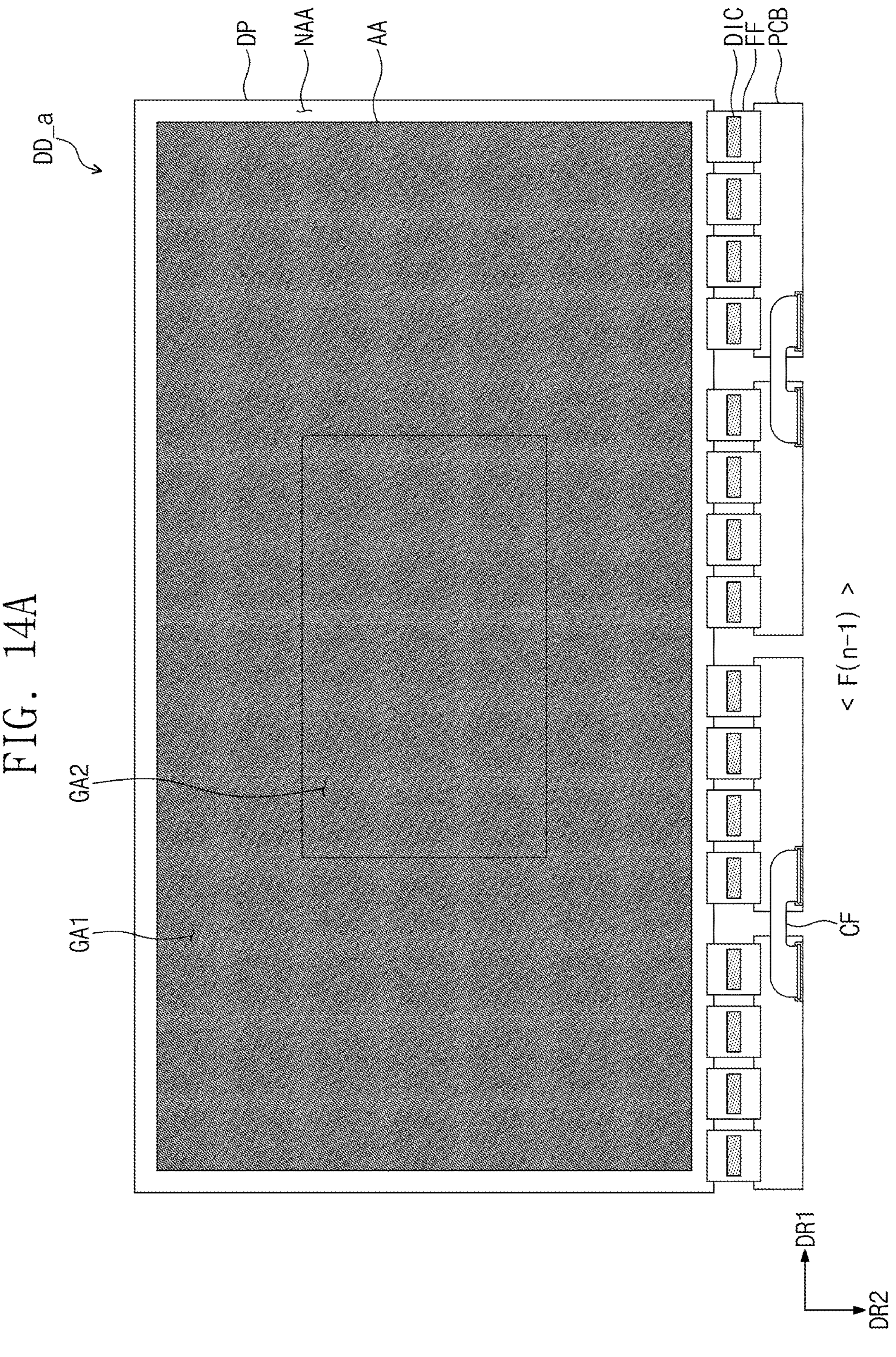
FIGS. 14A, 14B, and 14C are diagrams illustrating a change of a grayscale pattern for each frame according to an embodiment of the present disclosure.
Figure 14B:
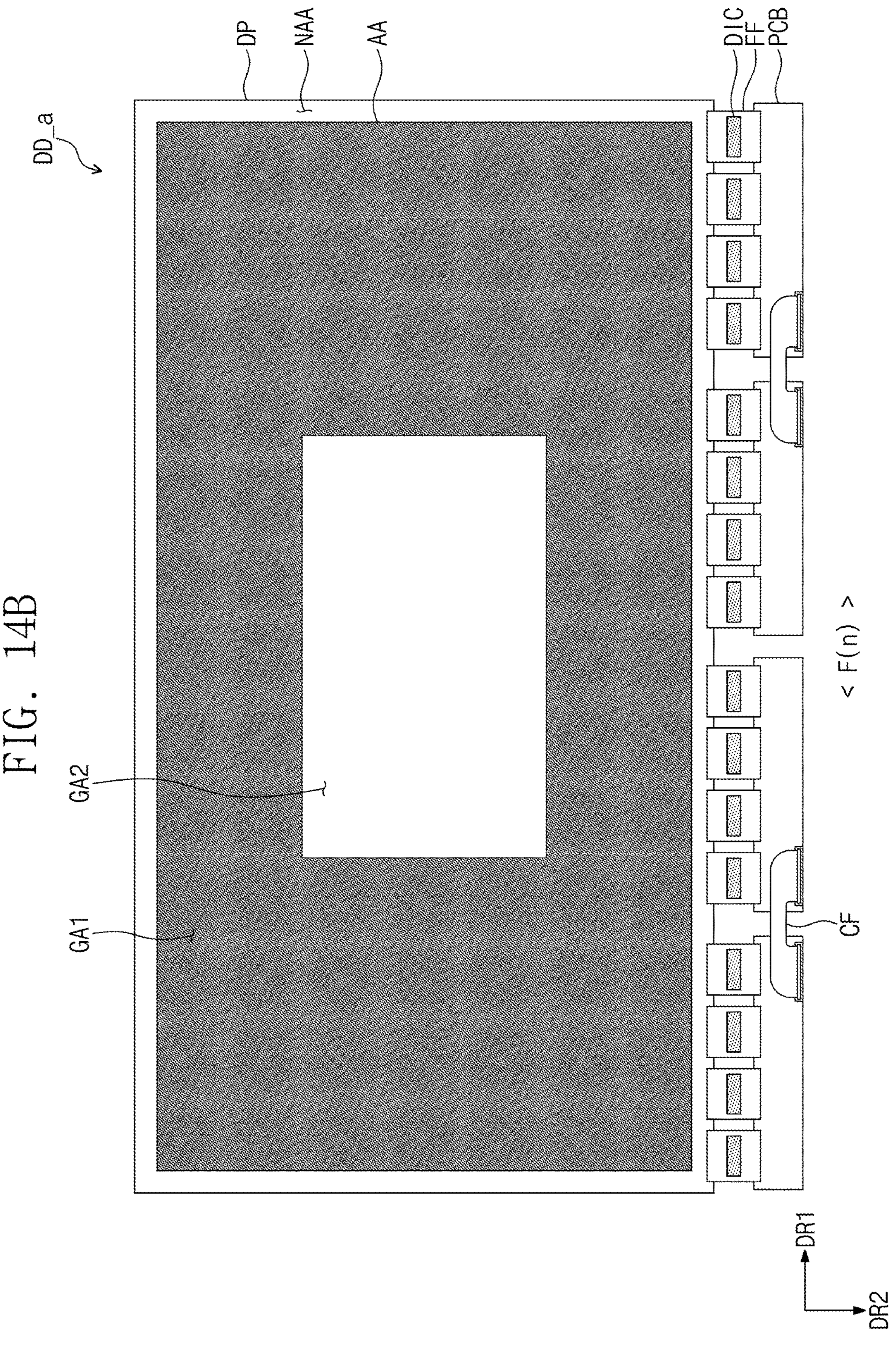
Figure 14C:
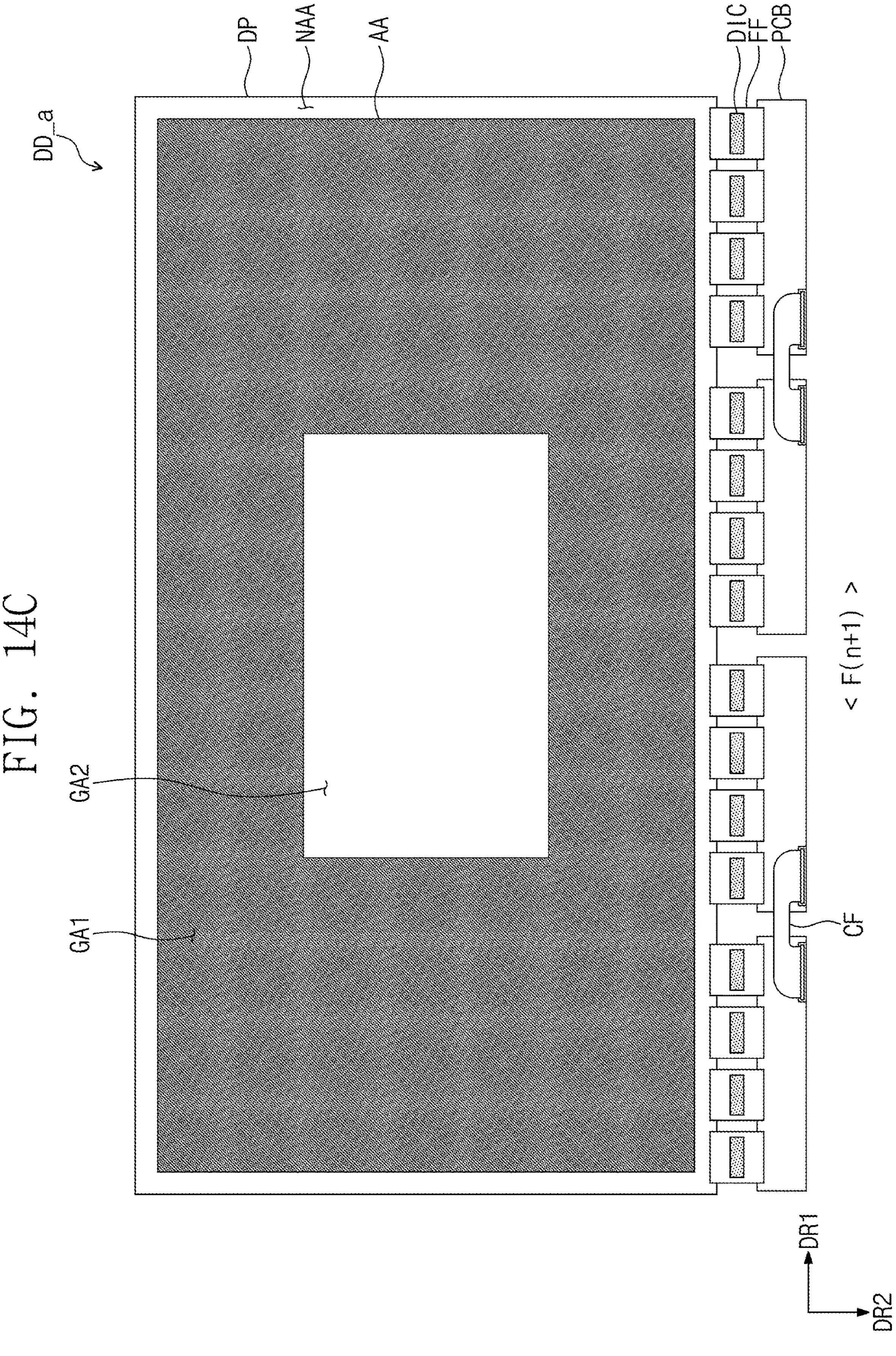
Figure 15A:
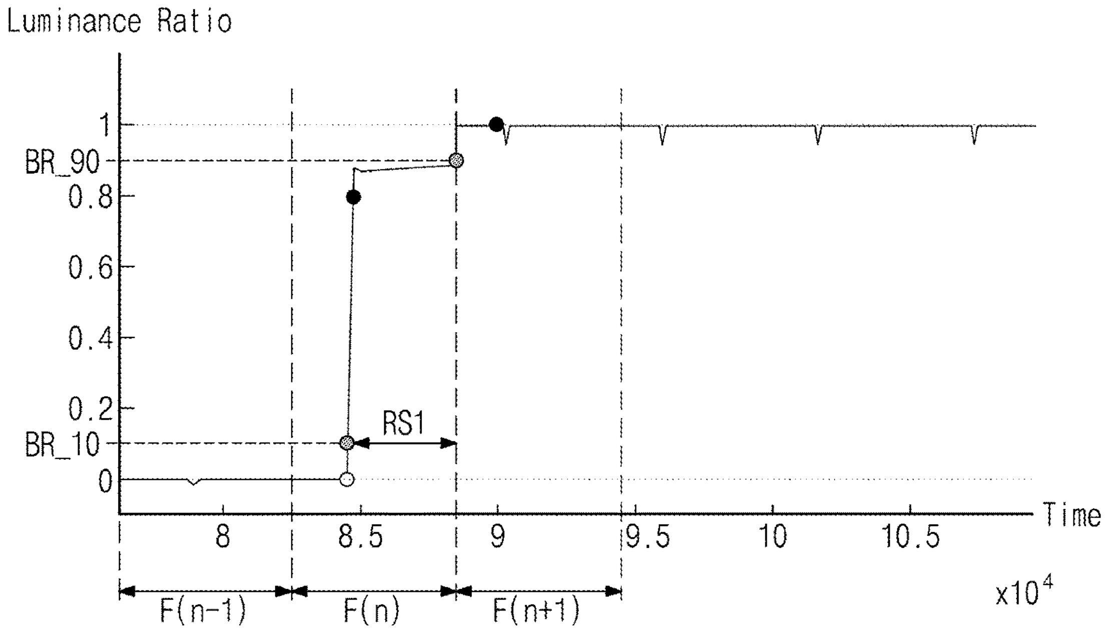
FIGS. 15A and 15B are waveform diagrams illustrating how a response speed changes as a grayscale pattern for each frame changes.
Figure 15B:
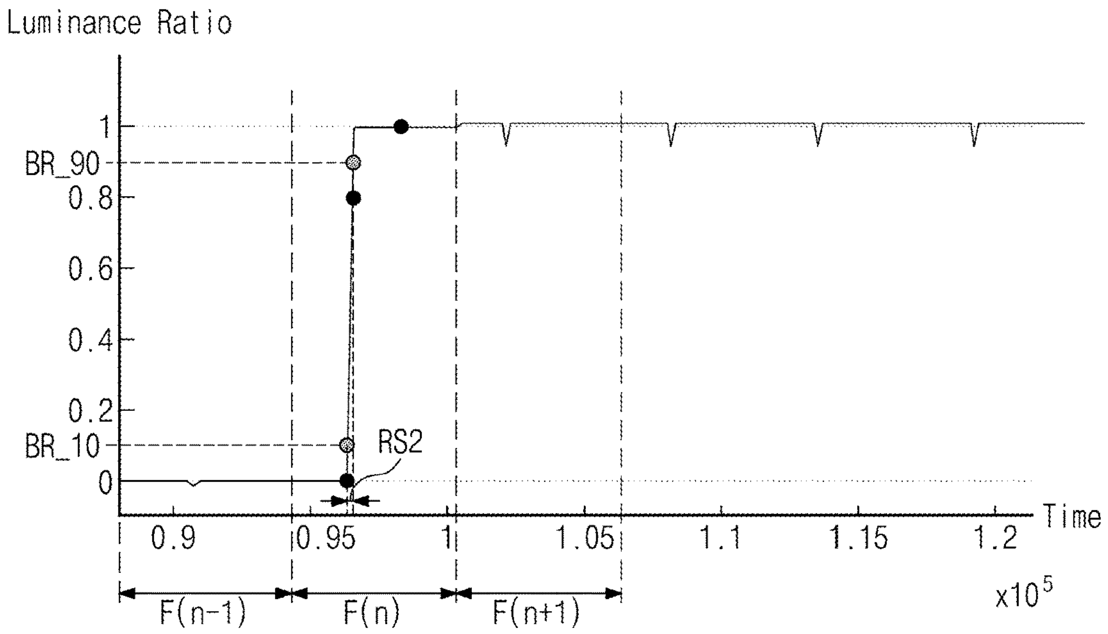

FIGS. 14A, 14B, and 14C are diagrams illustrating a change of a grayscale pattern for each frame according to an embodiment of the present disclosure, and FIGS. 15A and 15B are waveform diagrams illustrating how a response speed changes as a grayscale pattern for each frame changes.

Referring to FIGS. 14A, 14B, and 14C, the effective area AA of the display panel DP may include a first grayscale area GA1 and a second grayscale area GA2. During the previous frame F(n−1), all the first and second grayscale areas GA1 and GA2 may display a black image with a black grayscale. In the current frame F(n), the first grayscale area GA1 may maintain the black image, but the second grayscale area GA2 may display a white image with a white grayscale. In the next frame F(n+1), the first grayscale area GA1 may maintain the black image, and the second grayscale area GA2 may maintain the white image.

Examples in which the black image is displayed in the first grayscale area GA1 and the black or white image is displayed in the second grayscale area GA2 are illustrated in FIGS. 14A, 14B, and 14C, but the present disclosure is not limited thereto. For example, a first medium image with a first medium grayscale between the black grayscale and the white grayscale is displayed in the first grayscale area GA1, and a second medium image with a second medium grayscale between the black grayscale and the white grayscale is displayed in the second grayscale area GA2. The second medium grayscale may be identical to or different from the first medium grayscale.

In FIGS. 15A and 15B, an x-axis represents a time, and a y-axis represents a luminance ratio. The luminance ratio may be defined as a ratio that is obtained by dividing the target luminance by its own luminance. FIG. 15A shows a response speed in the normal mode, and FIG. 15B shows a response speed in the response speed enhancement mode.

Referring to FIGS. 14A and 15A, during the previous frame F(n−1), because the first and second grayscale areas GA1 and GA2 display the black image, the luminance ratio may be "0". In this case, in the previous frame F(n−1), the first driving voltage ELVDD (refer to FIG. 12A) may have a first voltage level.

Referring to FIGS. 14B and 15A, in the current frame F(n), the white image may be displayed in the second grayscale area GA2. Because the first driving voltage ELVDD in the current frame F(n) is determined by data having the maximum luminance from among the previous image data and the black image is displayed in the entire screen in the previous frame, in the normal mode, the first driving voltage ELVDD may be maintained at the first voltage level.

Even thoughthe luminance ratio of the display device DD_a is maintained at "0" during a partial period of the current frame F(n), in which the white image is not displayed in the second grayscale area GA2, the luminance ratio of the display device DD_a may increase from a time when the white image is displayed in the second grayscale area GA2. Herein, the response speed may be determined by a first time difference RS1 from a first time when the luminance ratio reaches a first reference luminance ratio BR_10 to a second time when the luminance ratio reaches a second reference luminance ratio BR_90. It is understood from FIG. 15A that the response speed becomes slower as the first time difference RS1 between the first and second times increases and becomes faster as the first time difference RS1 between the first and second times decreases. As an embodiment of the present disclosure, the first reference luminance ratio BR_10 may refer to a luminance ratio of 10% (i.e., 0.1) based on "1", and the second reference luminance ratio BR_90 may refer to a luminance ratio of 90% (i.e., 0.9) based on "1".

Referring to FIGS. 14C and 15A, the first driving voltage ELVDD in the next frame F(n+1) may have a second voltage level higher than the first voltage level. Because the first driving voltage ELVDD in the next frame F(n+1) is determined by data having the maximum luminance from among the current image data and the white image is displayed in the second grayscale area GA2 in the current frame F(n), in the normal mode, the first driving voltage ELVDD in the next frame F(n+1) may change to the second voltage level higher than the first voltage level. Herein, a difference between the second voltage level and the first voltage level may be the first variation or more. As the first driving voltage ELVDD is changed in the next frame F(n+1), the luminance ratio of the next frame F(n+1) may be higher than the luminance ratio of the current frame F(n).

Meanwhile, referring to FIGS. 14A and 15B, during the previous frame F(n−1), because the first and second grayscale areas GA1 and GA2 display the black image, the luminance ratio may be "0". In this case, in the previous frame F(n−1), the first driving voltage ELVDD (refer to FIG. 12A) may have the first voltage level.

Referring to FIGS. 14B and 15B, in the current frame F(n), the white image may be displayed in the second grayscale area GA2. In the response speed enhancement mode, the first driving voltage ELVDD in the current frame F(n) may be determined depending on whether a previous image based on the previous image data includes two or less grayscale areas. Because only the black grayscale area is included in the previous image, the first driving voltage ELVDD in the current frame F(n) may maintain the first voltage level like the previous frame.

Even thoughthe luminance ratio of the display device DD_a is maintained at "0" during a partial period of the current frame F(n), in which the white image is not displayed in the second grayscale area GA2, the luminance ratio of the display device DD_a may increase from a time point when the white image is displayed in the second grayscale area GA2. Herein, the response speed may be determined by a second time difference RS2 from the first time point when the luminance ratio reaches the first reference luminance ratio BR_10 to the second time point when the luminance ratio reaches the second reference luminance ratio BR_90. In the present disclosure, because the second time difference RS2 is smaller than the first time difference RS1, the response speed of the display device DD_a is enhanced in the response speed enhancement mode.

Referring to FIGS. 14C and 15B, the first driving voltage ELVDD in the next frame F(n+1) may be maintained at the first voltage level or may be increased as much as the second variation. In the response speed enhancement mode, the first driving voltage ELVDD in the next frame F(n+1) may be determined depending on whether a current image based on the current image data includes two or less grayscale areas. Because the first grayscale having the black grayscale and the second grayscale area having the white grayscale are included in the current image, the first driving voltage ELVDD in the next frame F(n+1) may be maintained at the first voltage level like the current frame F(n) or may change to a third voltage level. Herein, a difference between the third voltage level and the first voltage level may be referred to as a "second variation". As an embodiment of the present disclosure, the second variation may be greater than or equal to "0" and may be smaller than the first variation. Accordingly, in the response speed enhancement mode, because the first driving voltage ELVDD in the next frame F(n+1) has the first voltage level or the third voltage level, the luminance ratio of the next frame F(n+1) may be substantially the same as the luminance ratio of the current frame F(n).

Figure 16:
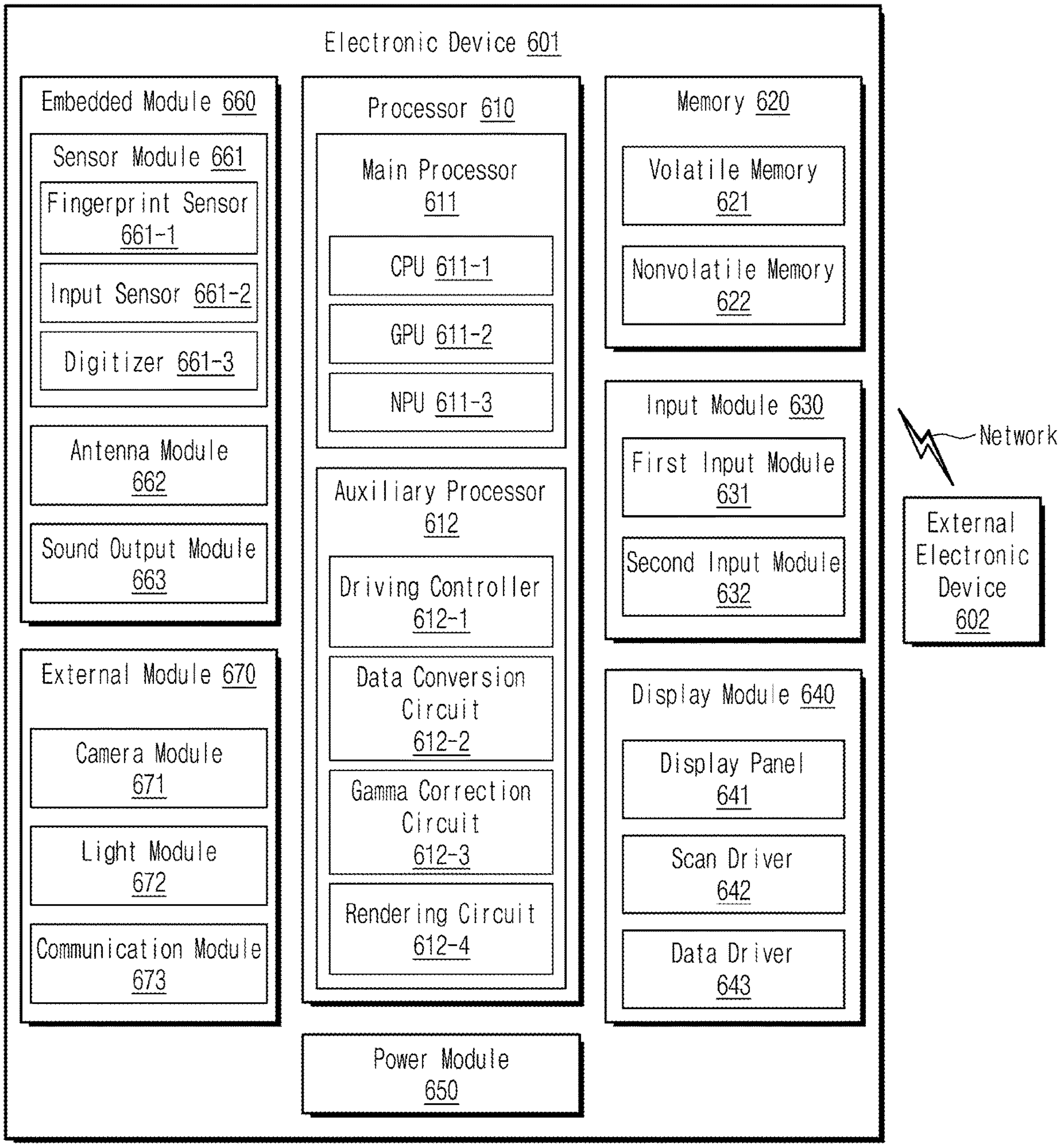
FIG. 16 is a block diagram of an electronic device according to an embodiment of the present disclosure.

FIG. 16 is a block diagram of an electronic device according to an embodiment of the present disclosure.

Referring to FIG. 16, an electronic device 601 outputs a variety of information through a display module 640 in an operating system. When a processor 610 executes an application stored in a memory 620, the display module 640 provides the user with application information through a display panel 641.

The processor 610 obtains an external input through an input module 630 or a sensor module 661 and executes an application corresponding to the external input. For example, when the user selects a camera icon displayed in the display panel 641, the processor 610 obtains the user input through an input sensor 661-2 and activates a camera module 671. The processor 610 transfers image data corresponding to a photographed image obtained through the camera module 671 to the display module 640. The display module 640 may display an image corresponding to the photographed image through the display panel 641.

As another example, when authentication for personal information is performed in the display module 640, a fingerprint sensor 661-1 obtains the input fingerprint information as input data. The processor 610 compares the input data obtained through the fingerprint sensor 661-1 and authentication data stored in the memory 620 and executes an application depending on a comparison result. The display module 640 may display information executed depending on logic of the application, through the display panel 641.

As another example, when the user selects a music streaming icon displayed in the display module 640, the processor 610 obtains the user input through the input sensor 661-2 and activates a music streaming application stored in the memory 620. When a music play command is input to the music streaming application, the processor 610 activates a sound output module 663 and provides the user with sound information corresponding to the music play command.

The operation of the electronic device 601 is briefly described above. Below, a configuration of the electronic device 601 will be described in detail. Some of components of the electronic device 601 to be described later may be integrally implemented with one component, and the one component may be divided into two or more components.

Referring to FIG. 16, the electronic device 601 may communicate with an external electronic device 602 over a network (e.g., a short-range wireless communication network or a long-range wireless communication network). According to an embodiment, the electronic device 601 may include the processor 610, the memory 620, the input module 630, the display module 640, a power module 650, an embedded module (or an internal module) 660, and an external module 670. According to an embodiment, the electronic device 601 may not include at least one of the above components or may further include one or more other components. According to an embodiment, some of the above components (e.g., the sensor module 661, an antenna module 662, or the sound output module 663) may be integrated into any other component (e.g., the display module 640).

The processor 610 may execute software to control at least one component (e.g., a hardware or software component) of the electronic device 601 connected with the processor 610 and may perform various data processing or operations. According to an embodiment, as at least a part of the data processing or operations, the processor 610 may store a command or data received from any other component (e.g., the input module 630, the sensor module 661, or a communication module 673) in a volatile memory 621, may process the command or data stored in the volatile memory 621, and may store the processed data in a nonvolatile memory 622.

The processor 610 may include a main processor 611 and an auxiliary processor 612. The main processor 611 may include one or more of a central processing unit (CPU) 611-1 or an application processor (AP). The main processor 611 may further include one or more of a graphic processing unit (GPU) 611-2, a communication processor (CP), and an image signal processor (ISP). The main processor 611 may further include a neural processing unit (NPU) 611-3. The neural processing unit 611-3 may be a processor specialized for processing of an artificial intelligence model, and the artificial intelligence model may be created through machine learning. The artificial intelligence model may include a plurality of artificial neural network layers. The artificial neural network may include one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more thereof, but the present disclosure is not limited thereto. Additionally or alternatively, the artificial intelligence model may include a software structure in addition to a hardware structure. At least two of the above processing units and processors may be integrally implemented with one component (e.g., a single chip), or each of the above processing units and processors may be implemented with an independent component (e.g., a plurality of chips).

The auxiliary processor 612 may include a driving controller 612-1. The driving controller 612-1 may include an interface conversion circuit and a timing control circuit. The driving controller 612-1 receives an image signal from the main processor 611 and outputs image data obtained by converting a data format of the image signal so as to be suitable for the specification of an interface with the display module 640. The driving controller 612-1 may output various kinds of control signals necessary to drive the display module 640. A configuration of the driving controller 612-1 is similar to that of the driving controller 100 illustrated in FIG. 3 or the driving controller 100_*a* illustrated in FIG. 11, and thus, additional description will be omitted to avoid redundancy.

The auxiliary processor 612 may further include a data conversion circuit 612-2, a gamma correction circuit 612-3, and a rendering circuit 612-4. The data conversion circuit 612-2 may receive image data from the driving controller 612-1; the data conversion circuit 612-2 may compensate for the image data such that an image is displayed with a desired luminance depending on a characteristic of the electronic device 601 or user settings or may convert the image data to reduce power consumption or to compensate for afterimages. The gamma correction circuit 612-3 may convert the image data or the gamma reference voltage such that an image displayed on the electronic device 601 has a desired gamma characteristic. The rendering circuit 612-4 may receive the image data from the driving controller 612-1 and may render the image data in consideration of a pixel arrangement of the display panel 641 applied to the electronic device 601. At least one of the data conversion circuit 612-2, the gamma correction circuit 612-3, and the rendering circuit 612-4 may be integrated into any other component (e.g., the main processor 611 or the driving controller

612-1). At least one of the data conversion circuit 612-2, the gamma correction circuit 612-3, and the rendering circuit 612-4 may be integrated into a data driver 643 to be described later.

The memory 620 may stores various data used by at least one component (e.g., the processor 610 or the sensor module 661) of the electronic device 601 and input data or output data for commands related thereto. The memory 620 may include at least one of the volatile memory 621 and the nonvolatile memory 622.

The input module 630 may receive a command or data to be used by a component (e.g., the processor 610, the sensor module 661, or the sound output module 663) of the electronic device 601 from the outside of the electronic device 601 (e.g., the user or the external electronic device 602).

The input module 630 may include a first input module 631 to which a command or data are input from the user and a second input module 632 to which a command or data are input from the external electronic device 602. The first input module 631 may include a microphone, a mouse, a keyboard, a key (e.g., a button), or a pen (e.g., a passive pen or an active pen). The second input module 632 may support a specified protocol capable of connecting to the external electronic device 602 by wire or wirelessly. According to one embodiment, the second input module 632 may include a high definition multimedia interface (HDMI), a universal serial bus (USB) interface, a secure digital (SD) card interface, or an audio interface. The second input module 632 may include a connector capable of being physically connected with the external electronic device 602, for example, an HDMI connector, a USB connector, an SD card connector, or an audio connector (e.g., a headphone connector).

The display module 640 visually provides information to the user. The display module 640 may include the display panel 641, a scan driver 642, and the data driver 643. The display module 640 may further include a window, a chassis, and a bracket for protecting the display panel 641. The display module 640 may further include an emission driver, a voltage generator, etc. The voltage generator may output various kinds of voltages (e.g., the first and second driving voltages ELVDD and ELVSS (refer to FIG. 3)) necessary for driving the display panel 641. Configurations of the display panel 641, the scan driver 642, the data driver 643, and the voltage generator are substantially similar to those of the display panel DP, the scan driver 250, the data driver 200, and the voltage generator 300 illustrated in FIG. 3, and thus, additional description will be omitted to avoid redundancy.

The power module 650 supplies a power to the components of the electronic device 601. The power module 650 may include a battery that charges a power supply voltage. The battery may include a primary cell not recharged, a secondary cell rechargeable, or a fuel cell. The power module 650 may include a power management integrated circuit (PMIC). The PMIC supplies a power optimized for each of the modules described above and modules to be described later. The power module 650 may include a wireless power transmission/reception member electrically connected with the battery. The wireless power transmission/reception member may include a plurality of antenna radiators that are in the form of a coil.

The electronic device 601 may further include the embedded module 660 and the external module 670. The embedded module 660 may include the sensor module 661, the antenna module 662, and the sound output module 663. The external module 670 may include the camera module 671, a light module 672, and the communication module 673.

The sensor module 661 may sense an input by a user's body or an input by a pen among the first input module 631 and may generate an electrical signal or a data value corresponding to the input. The sensor module 661 may include at least one or more of the fingerprint sensor 661-1, the input sensor 661-2, and a digitizer 661-3.

The fingerprint sensor 661-1 may generate a data value corresponding to the user's fingerprint. The fingerprint sensor 661-1 may include one of an optical fingerprint sensor or a capacitive fingerprint sensor.

The input sensor 661-2 may generate a data value corresponding to coordinate information of the input by the user's body or the input by the pen. The input sensor 661-2 generates a capacitance change due to the input as a data value. The input sensor 661-2 may sense the input by the passive pen or may exchange data with the active pen.

The input sensor 661-2 may measure a biometric signal such as blood pressure, moisture, or body fat. For example, when the user touches his/her body part to a sensor layer or a sensing panel and does not move during a given time period, the input sensor 661-2 may detect the biometric signal based on a change in an electric field caused by the body part and may output the information desired by the user to the display module 640.

The digitizer 661-3 may generate a data value corresponding to the coordinate information of the input by the pen. The digitizer 661-3 generates the amount of electromagnetic change by the input as a data value. The digitizer 661-3 may sense the input by the passive pen or may exchange data with the active pen.

At least one of the fingerprint sensor 661-1, the input sensor 661-2, and the digitizer 661-3 may be implemented with a sensor layer formed on the display panel 641 through a continuous process. The fingerprint sensor 661-1, the input sensor 661-2, and the digitizer 661-3 may be disposed above/on the display panel 641, and at least one of the fingerprint sensor 661-1, the input sensor 661-2, and the digitizer 661-3, for example, the digitizer 661-3 may be disposed below/under the display panel 641.

At least two or more of the fingerprint sensor 661-1, the input sensor 661-2, and the digitizer 661-3 may be integrally formed with one sensing panel through the same process. When they are integrally formed with one sensing panel, the sensing panel may be disposed between the display panel 641 and the window disposed above/on the display panel 641. According to one embodiment, the sensing panel may be disposed on the window, and the location of the sensing panel is not specifically limited.

At least one of the fingerprint sensor 661-1, the input sensor 661-2, and the digitizer 661-3 may be embedded in the display panel 641. That is, at least one of the fingerprint sensor 661-1, the input sensor 661-2, and the digitizer 661-3 may be simultaneously formed through a process of forming elements (e.g., a light emitting device and transistors) included in the display panel 641.

In addition, the sensor module 661 may generate an electrical signal or a data value corresponding to an internal state or an external state of the electronic device 601. The sensor module 661 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 662 may include one or more antennas to transmit or receive the signal or power to or from an external source. According to an embodiment, through an antenna suitable for a communication method, the communication module 673 may transmit a signal to an external electronic device or may receive a signal from the external electronic device. An antenna pattern of the antenna module 662 may be integrated with one component (e.g., the display panel 641) of the display module 640 or the input sensor 661-2.

The sound output module 663 that is a device for outputting a sound signal to the outside of the electronic device 601 may include, for example, a speaker used for general purposes such as multimedia playback or recording playback and a receiver used exclusively for receiving calls. According to an embodiment, the receiver and the speaker may be either integrally or separately implemented. A sound output pattern of the sound output module 663 may be integrated with the display module 640.

The camera module 671 may photograph a still image and a moving image. According to one embodiment, the camera module 671 may include one or more lenses, an image sensor, or an image signal processor. The camera module 671 may further include an infrared camera capable of measuring the presence or absence of the user, the location of the user, and the line of sight of the user.

The light module 672 may provide a light. The light module 672 may include a light emitting diode or a xenon lamp. The light module 672 may operate in conjunction with the camera module 671 or may operate independently.

The communication module 673 may establish a wired or wireless communication channel between the electronic device 601 and the external electronic device 602 and may support communication execution through the established communication channel. The communication module 673 may include one of a wireless communication module, such as a cellular communication module, a short-range wireless communication module, or a global navigation satellite system (GNSS) communication module, and a wired communication module, such as a local area network (LAN) communication module or a power line communication module or may include all thereof. The communication module 673 may communicate with the external electronic device 602 over a short-range communication network such as Bluetooth, Wi-Fi direct, or infrared data association (IrDA) or a long-range communication network such as a cellular network, an Internet, or a computer network (e.g., a LAN or WAN). Various kinds of communication modules described above may be implemented with one chip or with separate chips, respectively.

The input module 630, the sensor module 661, the camera module 671, etc. may be used to control the operation of the display module 640 in conjunction with the processor 610.

The processor 610 outputs commands or data to the display module 640, the sound output module 663, the camera module 671, or the light module 672 based on the input data received from the input module 630. For example, the processor 610 may generate the image data corresponding to the input data applied through the mouse or the active pen and may output the image data to the display module 640; alternatively, the processor 610 may generate command data corresponding to the input data and may output the command data to the camera module 671 or the light module 672. When input data are not received from the input module 630 during a given time period, the processor 610 may switch an operating mode of the electronic device 601 to a low-power mode or a sleep mode such that the power consumption of the electronic device 601 is reduced.

The processor 610 outputs commands or data to the display module 640, the sound output module 663, the camera module 671, or the light module 672 based on the sensing data received from the sensor module 661. For example, the processor 610 may compare authentication data obtained through the fingerprint sensor 661-1 with authentication data stored in the memory 620 and may then execute an application depending on a comparison result. The processor 610 may execute a command based on the sensing data sensed by the input sensor 661-2 or the digitizer 661-3 or may output image data corresponding to the sensing data to the display module 640. When the sensor module 661 includes a temperature sensor, the processor 610 may receive temperature data associated with the measured temperature from the sensor module 661 and may further perform luminance correction on the image data based on the temperature data.

The processor 610 may receive measurement data about the presence or absence of the user, the location of the user, and the line of sight of the user from the camera module 671. The processor 610 may further perform the luminance correction on the image data based on the measurement data. For example, the processor 610 that determines the presence or absence of the user through the input from the camera module 671 may display image data whose luminance is corrected through the data conversion circuit 612-2 or the gamma correction circuit 612-3.

Some of the above components may be connected with each other through a communication scheme between peripheral devices, for example, a bus, a general purpose input/output (GPIO), a serial peripheral interface (SPI), a mobile industry processor interface (MIPI), or a ultra path interconnect (UPI) link and may exchange signals (e.g., commands or data). The processor 610 may communicate with the display module 640 through a given interface. For example, one of the communication methods described above may be used, and the present disclosure is not limited thereto.

The electronic device 601 according to various embodiments of the present disclosure may be implemented as various types of devices. The electronic device 601 may include, for example, at least one of a portable communication device (e.g., a smartphone), a computer device, a portable multimedia device, a portable medical device, a camera, a wearable device, and home appliances. The electronic device 601 according to an embodiment of the present disclosure is not limited to the above devices.

According to the present disclosure, as an image having given reference luminance is displayed during a non-compensation frame in at least one of given cases for the purpose of removing a flicker phenomenon occurring between the non-compensation frame, to which a current compensation operation is not applied, and a next frame, the flicker phenomenon may be removed, and power consumption may be reduced.

As a response speed enhancement mode is activated such that a variation in a first driving voltage is smaller than that in a normal mode, a response speed may be prevented from decreasing under a specific grayscale pattern condition in power-saving driving.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a pixel configured to receive a driving voltage;

a voltage generator configured to generate the driving voltage and to determine a voltage level of the driving voltage based on a voltage control signal; and a driving controller configured to control driving of the display panel, wherein the driving controller includes:

a current compensator configured to calculate a load based on a previous image data and to output compensation image data having a target luminance by compensating for a current image data based on the load, and wherein the driving controller is configured to:

turn on the current compensator in a normal mode such that an image is displayed with the target luminance, and turn off the current compensator in a setting mode such that an image corresponding to the current image data is displayed with a given reference luminance.

2. The display device of claim 1, wherein the current compensator is turned on in response to a first enable signal activated in the normal mode and is turned off in response to a second enable signal activated in the setting mode.

3. The display device of claim 2, wherein the driving controller further includes:

a reference compensator, wherein the reference compensator is turned on in response to the second enable signal in the setting mode and outputs a reference image data having the given reference luminance by compensating for the current image data.

4. The display device of claim 3, further comprising:

a data driver configured to:

in the normal mode, receive the compensation image data and output a compensation data voltage which is converted from the compensation image data to the display panel, and in the setting mode, receive the reference image data and output a reference data voltage which is converted from the reference image data to the display panel.

5. The display device of claim 2, further comprising:

a data driver, wherein the data driver includes a reference voltage generator, wherein in the normal mode, the reference voltage generator is turned on in response to the first enable signal and outputs a gamma reference voltage, and wherein, in the setting mode, the reference voltage generator compensates for the gamma reference voltage so as to be output as a compensation reference voltage.

6. The display device of claim 5, wherein the data driver further includes:

a gamma voltage generator configured to:

in the normal mode, receive the gamma reference voltage to generate gamma voltages, and in the setting mode, receive the compensation reference voltage to generate compensation gamma voltages; and a data converter configured to:

in the normal mode, convert the compensation image data into a compensation data voltage based on the gamma voltages, and in the setting mode, convert the current image data into a reference data voltage based on the compensation gamma voltages.

7. The display device of claim 2, wherein the normal mode is a mode which does not coincide with at least one case of given cases, and wherein the setting mode is a mode which coincides with the at least one case of the given cases.

8. The display device of claim 7, wherein the at least one case includes a case in which a transition to a normal operation period is made after a given reference image is displayed during a given standby period, and wherein the display device operates in the setting mode during a first period of the normal operation period and operates in the normal mode during a second period of the normal operation period, which is different from the first period.

9. The display device of claim 8, wherein the first period includes a first frame of the normal operation period, and wherein the second period includes remaining frames other than the first frame.

10. The display device of claim 8, wherein the standby period is a period in which the reference image is displayed from at least one of a power-on time point, a time point when a display setting condition is changed, and a time point when it is determined that an abnormal signal is received, to a time point when the normal operation period is initiated.

11. The display device of claim 1, further comprising:

a voltage controller configured to sense a driving current of the display panel, to compare the driving current and a given reference current, and to output the voltage control signal as a result of a comparison of the driving current and the given reference current.

12. The display device of claim 11, wherein the voltage controller includes:

a determination block configured to receive the driving voltage as a feedback, to compare the driving voltage and a given reference driving voltage, and to determine whether the driving voltage decreases, based on a result of a comparison of the driving voltage and the given reference driving voltage; and a signal generation block, wherein, when it is determined that the driving voltage does not decrease, the signal generation block compares the driving current and the given reference current to output the voltage control signal, wherein, when it is determined that the driving voltage decreases, the signal generation block provides a holding control signal to the voltage generator, and wherein, in response to the holding control signal, the voltage generator maintains the driving voltage without modification.

13. The display device of claim 12, wherein the voltage generator is configured to:

decrease the voltage level of the driving voltage in response to the voltage control signal during a previous frame, maintain the voltage level of the driving voltage in response to the holding control signal activated during a current frame, and adjust the voltage level of the driving voltage in response to the voltage control signal during a next frame.

14. A display device comprising:

a display panel including a pixel configured to receive a driving voltage;

a voltage generator configured to generate the driving voltage, to change a voltage level of the driving voltage as much as a given first variation or more, based on a voltage control signal, and to change the voltage level of the driving voltage as much as a second variation or less, based on a holding control signal, the second variation being smaller than the first variation; and a power consumption controller configured to determine whether a previous image based on a previous image data coincides with a given grayscale pattern condition and to generate the voltage control signal or the holding control signal depending on a result of a determination whether the previous image based on the previous image data coincides with the given grayscale pattern condition.

15. The display device of claim 14, wherein the grayscale pattern condition is a condition in which the previous image includes one grayscale area or two grayscale areas, and wherein the two grayscale areas are different in grayscale.

16. The display device of claim 14, wherein, when the second variation is "0", the voltage generator maintains the voltage level of the driving voltage without modification.

17. The display device of claim 14, wherein the power consumption controller is configured to:

generate the voltage control signal based on a maximum image data having a maximum luminance from among the previous image data in a normal mode, and generate the voltage control signal or the holding a control signal depending on the determination in a response speed enhancement mode.

18. The display device of claim 14, wherein the voltage generator includes:

a first adjustment block configured to maintain the voltage level of the driving voltage or to change the voltage level of the driving voltage as much as the first variation or more, based on the voltage control signal; and a second adjustment block configured to change the voltage level of the driving voltage as much as the second variation or less, based on the holding control signal.

19. The display device of claim 18, wherein the voltage generator is configured to:

output the driving voltage having a first voltage level during a previous frame, output the driving voltage maintained at the first voltage level during a current frame, and output the driving voltage having a third voltage level changed from the first voltage level as much as the second variation during a next frame.

20. An electronic device comprising:

a display module including a display panel configured to receive a driving voltage and a voltage generator configured to generate the driving voltage and to determine a voltage level of the driving voltage based on a voltage control signal;

a driving controller configured to receive an image signal and to convert the image signal into an image data; and a main processor configured to provide the image signal to the driving controller, wherein the driving controller includes:

a current compensator configured to calculate a load based on a previous image data and to an output compensation image data having a target luminance by compensating for a current image data based on the load, and wherein the driving controller is configured to:

turn on the current compensator in a normal mode such that an image is displayed with the target luminance, and turn off the current compensator in a setting mode such that an image corresponding to the current image data is displayed with a given reference luminance.

21. An electronic device comprising:

a display panel configured to receive a driving voltage;

a voltage generator configured to generate the driving voltage, to change a voltage level of the driving voltage as much as a given first variation or more based on a voltage control signal, and to change the voltage level of the driving voltage as much as a second variation or less based on a holding control signal, the second variation being smaller than the first variation; and a driving controller configured to receive an image signal and to convert the image signal into an image data;

a main processor configured to provide the image signal to the driving controller; and a power consumption controller configured to determine whether a previous image based on a previous image data coincides with a given grayscale pattern condition and to generate the voltage control signal or the holding control signal depending on a result of a determination whether the previous image based on the previous image data coincides with the given grayscale pattern condition.

* * * * *